United States Patent
Piliouras

(10) Patent No.: US 8,893,241 B2
(45) Date of Patent: *Nov. 18, 2014

(54) SYSTEMS AND METHODS FOR UNIVERSAL ENHANCED LOG-IN, IDENTITY DOCUMENT VERIFICATION AND DEDICATED SURVEY PARTICIPATION

(71) Applicant: Albright Associates, Weston, CT (US)

(72) Inventor: Teresa C. Piliouras, Weston, CT (US)

(73) Assignee: Albright Associates, Weston, CT (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/794,007

(22) Filed: Mar. 11, 2013

(65) Prior Publication Data

US 2013/0198815 A1  Aug. 1, 2013

Related U.S. Application Data

(60) Continuation-in-part of application No. 13/556,919, filed on Jul. 24, 2012, now Pat. No. 8,713,650, which is a continuation of application No. 13/243,350, filed on Sep. 23, 2011, now Pat. No. 8,255,452, which is a division of application No. 12/101,722, filed on Apr. 11, 2008, now Pat. No. 8,056,118.

(60) Provisional application No. 60/932,722, filed on Jun. 1, 2007, provisional application No. 60/932,721, filed on Jun. 1, 2007, provisional application No. 60/932,599, filed on Jun. 1, 2007.

(51) Int. Cl.

| | |
|---|---|
| G06F 21/00 | (2013.01) |
| H04L 29/06 | (2006.01) |
| G06F 21/60 | (2013.01) |
| G06F 21/41 | (2013.01) |
| G06Q 30/02 | (2012.01) |
| H04L 29/08 | (2006.01) |
| G06F 21/33 | (2013.01) |

(52) U.S. Cl.
CPC .............. *H04L 63/08* (2013.01); *G06F 21/60* (2013.01); *G06F 21/41* (2013.01); *G06Q 30/0203* (2013.01); *G06Q 30/0207* (2013.01); *G06Q 30/0269* (2013.01); *H04L 63/083* (2013.01); *H04L 63/10* (2013.01); *H04L 63/12* (2013.01); *H04L 67/02* (2013.01); *G06F 21/33* (2013.01); *G06F 21/335* (2013.01); *G06F 2221/2119* (2013.01); *H04L 67/306* (2013.01); *G06F 2221/2117* (2013.01)
USPC ................................................. 726/5; 713/176

(58) Field of Classification Search
CPC .................. H04K 29/06823; H04K 29/06836; H04K 29/0685; H04K 29/06857; H04K 29/06863
USPC ............................................................ 726/5
See application file for complete search history.

(56) References Cited

U.S. PATENT DOCUMENTS

| | | |
|---|---|---|
| 4,879,747 A | 11/1989 | Leighton et al. |
| 5,475,826 A | 12/1995 | Fischer |

(Continued)

OTHER PUBLICATIONS

U.S. Non-Final Office Action dated Dec. 21, 2011 in corresponding U.S. Appl. No. 13/243,350, filed Sep. 21, 2011, 14 pages.

(Continued)

Primary Examiner — Krisna Lim

(74) Attorney, Agent, or Firm — Foley & Lardner LLP

(57) ABSTRACT

Systems and methods are provided for controlling access via a computer network to a subscriber server. A log-in server receives a query to connect through the computer network to the subscriber server, and the log-in server receives registrant identification data, A first session is established between the log-in server and the subscriber server to validate the registrant identification data, and to generate a session password. A second session is established between the log-in server and the subscriber server. The second session is configured to authorize, based in part on the registrant identification data, access to at least a portion of a website associated with the subscriber server.

20 Claims, 10 Drawing Sheets

(56) References Cited

U.S. PATENT DOCUMENTS

| | | | |
|---|---|---|---|
| 5,694,471 A | 12/1997 | Chen et al. | |
| 5,768,519 A | 6/1998 | Swift et al. | |
| 5,855,008 A | 12/1998 | Goldhaber et al. | |
| 6,175,833 B1 | 1/2001 | West et al. | |
| 6,236,975 B1 | 5/2001 | Boe et al. | |
| 6,393,471 B1 | 5/2002 | Kobata | |
| 6,778,807 B1 | 8/2004 | Martino et al. | |
| 6,941,271 B1 | 9/2005 | Soong | |
| 6,959,281 B1 | 10/2005 | Freeling et al. | |
| 6,978,369 B2 | 12/2005 | Wheeler et al. | |
| 7,003,669 B2 | 2/2006 | Monk | |
| 7,020,645 B2 | 3/2006 | Bisbee et al. | |
| 7,054,830 B1 | 5/2006 | Eggleston et al. | |
| 7,059,516 B2 | 6/2006 | Matsuyama et al. | |
| 7,100,195 B1 | 8/2006 | Underwood | |
| 7,110,573 B2 | 9/2006 | Monk et al. | |
| 7,158,959 B1 | 1/2007 | Chickering et al. | |
| 7,225,977 B2 | 6/2007 | Davis | |
| 7,314,162 B2 | 1/2008 | Carr et al. | |
| 7,353,283 B2 | 4/2008 | Henaff et al. | |
| 7,568,098 B2 | 7/2009 | Yeates et al. | |
| 7,640,336 B1 | 12/2009 | Lu et al. | |
| 2001/0027472 A1 | 10/2001 | Guan | |
| 2001/0047292 A1 | 11/2001 | Montoya | |
| 2001/0054153 A1 | 12/2001 | Wheeler et al. | |
| 2001/0054155 A1 | 12/2001 | Hagan et al. | |
| 2002/0004935 A1 | 1/2002 | Huotari et al. | |
| 2002/0007303 A1 | 1/2002 | Brookler et al. | |
| 2002/0016734 A1 | 2/2002 | McGill et al. | |
| 2002/0128908 A1 | 9/2002 | Levin et al. | |
| 2002/0143632 A1 | 10/2002 | Walter et al. | |
| 2003/0115151 A1 | 6/2003 | Wheeler et al. | |
| 2003/0115459 A1 | 6/2003 | Monk | |
| 2003/0132285 A1 | 7/2003 | Blancas et al. | |
| 2003/0149781 A1 | 8/2003 | Yared et al. | |
| 2003/0171976 A1 | 9/2003 | Farnes et al. | |
| 2003/0172272 A1 | 9/2003 | Ehlers et al. | |
| 2003/0182420 A1 | 9/2003 | Jones et al. | |
| 2003/0189093 A1 | 10/2003 | Fujimoto | |
| 2003/0200468 A1 | 10/2003 | Raley et al. | |
| 2003/0229783 A1 | 12/2003 | Hardt | |
| 2004/0002842 A1 | 1/2004 | Woessner et al. | |
| 2004/0093257 A1 | 5/2004 | Rogers et al. | |
| 2004/0093261 A1 | 5/2004 | Jain et al. | |
| 2004/0099731 A1 | 5/2004 | Olenick et al. | |
| 2004/0128392 A1 | 7/2004 | Blakley et al. | |
| 2004/0189441 A1 | 9/2004 | Stergiou | |
| 2004/0225887 A1 | 11/2004 | O'Neil et al. | |
| 2004/0230807 A1 | 11/2004 | Baird et al. | |
| 2004/0237047 A1* | 11/2004 | Houle et al. | 715/541 |
| 2004/0245330 A1 | 12/2004 | Swift et al. | |
| 2004/0250118 A1 | 12/2004 | Andreev et al. | |
| 2005/0027566 A1 | 2/2005 | Haskell | |
| 2005/0044423 A1 | 2/2005 | Mellmer et al. | |
| 2005/0065935 A1 | 3/2005 | Chebolu et al. | |
| 2005/0116025 A1* | 6/2005 | Davis | 235/380 |
| 2005/0131756 A1 | 6/2005 | Benson | |
| 2005/0131829 A1 | 6/2005 | Messina | |
| 2005/0144066 A1 | 6/2005 | Cope et al. | |
| 2005/0144297 A1 | 6/2005 | Dahlstrom et al. | |
| 2005/0144482 A1 | 6/2005 | Anuszewski | |
| 2005/0154665 A1 | 7/2005 | Kerr | |
| 2005/0165643 A1 | 7/2005 | Wilson et al. | |
| 2005/0166233 A1 | 7/2005 | Beyda et al. | |
| 2005/0192863 A1 | 9/2005 | Mohan | |
| 2005/0197884 A1 | 9/2005 | Mullen, Jr. | |
| 2006/0004621 A1 | 1/2006 | Malek et al. | |
| 2006/0075475 A1 | 4/2006 | Boulos et al. | |
| 2006/0085254 A1 | 4/2006 | Grim et al. | |
| 2006/0086783 A1 | 4/2006 | Tredeau et al. | |
| 2006/0121434 A1 | 6/2006 | Azar | |
| 2006/0157559 A1 | 7/2006 | Levy et al. | |
| 2006/0173792 A1 | 8/2006 | Glass | |
| 2006/0202012 A1* | 9/2006 | Grano et al. | 235/379 |
| 2006/0271787 A1 | 11/2006 | DeYoung et al. | |
| 2006/0282883 A1 | 12/2006 | Rosenberg et al. | |
| 2007/0061334 A1 | 3/2007 | Ramer et al. | |
| 2007/0067297 A1 | 3/2007 | Kublickis | |
| 2007/0067405 A1 | 3/2007 | Eliovson | |
| 2007/0130005 A1 | 6/2007 | Jaschke | |
| 2007/0174214 A1 | 7/2007 | Welsh et al. | |
| 2007/0233688 A1 | 10/2007 | Smolen et al. | |
| 2007/0255643 A1 | 11/2007 | Capuano et al. | |
| 2008/0010352 A1 | 1/2008 | Donoho et al. | |
| 2008/0013700 A1 | 1/2008 | Butina | |
| 2008/0022414 A1 | 1/2008 | Cahn et al. | |
| 2008/0022424 A1 | 1/2008 | Diehn et al. | |
| 2008/0028220 A1* | 1/2008 | Wyssen | 713/176 |
| 2008/0033740 A1 | 2/2008 | Cahn et al. | |
| 2008/0040216 A1 | 2/2008 | Dellovo | |
| 2008/0052244 A1 | 2/2008 | Tsuei et al. | |
| 2008/0082394 A1 | 4/2008 | Floyd et al. | |
| 2008/0174100 A1* | 7/2008 | Reeves | 283/70 |
| 2008/0281716 A1 | 11/2008 | Nagoya et al. | |
| 2009/0037739 A1* | 2/2009 | Silverbrook et al. | 713/176 |
| 2009/0083118 A1 | 3/2009 | Kallery et al. | |
| 2011/0231226 A1 | 9/2011 | Golden | |

OTHER PUBLICATIONS

U.S. Non-Final Office Action dated Nov. 26, 2013 in corresponding U.S. Appl. No. 13/556,919, filed Jul. 24, 2012, 11 pages.

U.S. Notice of Allowance dated Jun. 12, 2012 in corresponding U.S. Appl. No. 13/243,350, filed Sep. 23, 2011, 21 pages.

Chandramouli, "A New Taxonomy for Analyzing Authentication Processes in Smart Card Usage Profiles", National Institute of Standards & Technology.

Kuklinski, "Automated Authentication of Current Identity Documents", 2004 IEEE, Conference on Technologies for Homeland Security, Apr. 21-22, 2004.

Notice of Allowance dated Mar. 4, 2014 in corresponding U.S. Appl. No. 13/556,919, filed Jul. 24, 2012, 11 pages.

Theodore Kuklinski, Ph.D., Automated Authentication of Current Identity Documents, 2004 IEEE Conference on Technologies for Homeland Security, Apr. 21-22, 2004.

R. Chandramouli, A New Taxonomy for Analyzing Authentication Processes in Smart Card Usage Profiles, National Institute of Standards & Technology.

Kuklinski, T. "Automated Authentication of Current Identity Documents", Proceedings of IEEE Conference on Technologies for Homeland Security, Apr. 21-22, 2004.

US Notice of Allowance in U.S. Appl. No. 13/243,350 mailed Jun. 12, 2012.

US Office Action in U.S. Appl. No. 13/243,350, dated Dec. 21, 2011.

* cited by examiner

SYSTEMS AND METHODS FOR UNIVERSAL ENHANCED LOG-IN, IDENTITY DOCUMENT VERIFICATION AND DEDICATED SURVEY PARTICIPATION

CROSS REFERENCE TO RELATED APPLICATIONS

This application claims priority as a continuation-in-part under 35. U.S.C. §120 to U.S. patent application Ser. No. 13/556,919 filed on Jul. 24, 2012, titled "SYSTEMS AND METHODS FOR UNIVERSAL ENHANCED LOG-IN, IDENTITY DOCUMENT VERIFICATION, AND DEDICATED SURVEY PARTICIPATION," issued as U.S. Pat. No. 8,713,650 on Apr. 29, 2014, which claims priority as a continuation under 35 U.S.C. §120 to U.S. patent application Ser. No. 13/243,350 filed on Sep. 23, 2011, titled "SYSTEMS AND METHODS FOR UNIVERSAL ENHANCED LOG-IN, IDENTITY DOCUMENT VERIFICATION, AND DEDICATED SURVEY PARTICIPATION," issued as U.S. Pat. No. 8,255,452 on Aug. 28, 2012, which claims priority as a divisional under 35 U.S.C. §121 to U.S. patent application Ser. No. 12/101,722 filed on Apr. 11, 2008, titled "SYSTEMS AND METHODS FOR UNIVERSAL ENHANCED LOG-IN, IDENTITY DOCUMENT VERIFICATION, AND DEDICATED SURVEY PARTICIPATION," issued as U.S. Pat. No. 8,056,118 on Nov. 8, 2011, which claims priority under 35 U.S.C. 119(e) to U.S. Provisional Application Ser. No. 60/932,722, titled "ANONYMOUS SURVEY ADVERTISING PROGRAMS," by Teresa C. Piliouras, filed Jun. 1, 2007; U.S. Provisional Application Ser. No. 60/932,721, titled "SYSTEM TO COLLECT STATISTICS AND PRODUCE REPORTS ON USE, FREQUENCY, AND TYPES OF FRAUDULENT IDENTITY DOCUMENTATION PRESENTED AT VARIOUS LOCATIONS," by Teresa C. Piliouras, filed Jun. 1, 2007; and U.S. Provisional Application Ser. No. 60/932,599, entitled "UNIVERSAL ENHANCED LOG-IN SERVICE (UELS)," by Teresa C. Piliouras, filed Jun. 1, 2007, each of which are incorporated by reference in their entirety.

BACKGROUND

Computer networks such as the Internet facilitate the transmission and exchange of a broad spectrum of content. This content is generally available to anyone using a computer that forms part of one of these computer networks. For example, by visiting a webpage, or entering a chat room of a particular web site, one may gain exposure to information, images, videos, text, or other forms of data on a plurality of topics, some of which may be illicit or even illegal in some jurisdictions.

Unfettered access to computer networks such as the Internet poses a risk to certain classes of users, such as children, of exposure to material that others, such as parents, may deem inappropriate. Although these risks may affect anyone, children are particularly vulnerable. More than 80 million children are estimated to use the Internet, along with an unknown number of criminals, predators, and malfeasants. Children and other users are susceptible to predatory behavior and may unwittingly compromise personal information such as names, passwords, addresses, contact information, social security numbers, or age, for example. Users of these networks may also receive unsolicited or offensive information, requests, or images.

Blocking access by certain users or classes of users to select content available on a computer network is not without its drawbacks. Existing age verification technology is unreliable and easily falsified or circumvented. Effective parental controls are lacking, and minors can quite easily access content against the wishes of their parents or legal guardians.

Identification documents such as birth certificates, passports, social security cards, and driver licenses are generally issued by a government to its citizens or residents. Private entities such as businesses, also issue identification documents such as building passes, identification badges. However, the issuers of these various forms of identification cannot control or monitor their use once a citizen, resident, or employee takes possession of the identity document. In other words, a person in possession of an identity document can show that identity document to whomever he or she wishes, and the merchant, security personnel, or government agent must independently verify or decide to rely on the veracity of the identity document.

It is plain to see that fraudulently presented identification documents can lead to a host of problems and illicit behavior. Falsified or counterfeit identification documents can enable the unauthorized collection of government benefits such as pension, social security, or disability payments. Document misuse also leads to other criminal activity ranging from the illegal purchase of anything from alcohol to firearms, and can enable unauthorized entry into restricted areas. This may also include unauthorized entry into websites providing restricted content or data of a personal nature.

Large scale surveys can provide valuable information to merchants and researchers. For example, survey results can allow merchants to market their products in ways that can maximize sales and profits. However, unsolicited surveys and advertising materials are often perceived as irritating and tend to have very low response rates. Standard communication channels such as telephone and mail based surveys have further inherent drawbacks, as they are not anonymous and it is difficult for a merchant conducting a survey to find a targeted audience. These types of surveys can also be inefficient and costly as telephone and postal charges are incurred and it is not feasible to target a particular demographic or subgroup of a general population. These difficulties are compounded by inherent problems in proving a person's identity and associated profile characteristics so a target population of interest can be properly pre-qualified. Traditional communication channels make it difficult to reach or interact with target populations in a timely, practical, and cost effective manner.

SUMMARY

At least one embodiment relates generally to verified access to a computer network, and more specifically, to providing access to a computer network specific to a profile of a user.

The systems and methods disclosed herein can provide reliable communication channels to verify the identity of computer network users, and can grant or deny access to data and system network functions based on user identity or other characteristics. To increase efficiency, different forms of identity verification may be used. Further, safe and social interactions between users can be allowed. These security precautions improve and protect the security of network users.

The systems and methods disclosed herein can provide a large pool of prequalified subscribers to a service who have agreed to participate in various anonymous survey or advertising programs. To increase efficiency, prequalified subscribers can be identified as belonging to one or more particular demographics or subgroups based on factors such as age, gender, economic status, location, or various purchasing habits. Further, this results in higher survey participation and response rates, and more accurate and useful survey results. Survey results from prequalified subscribers enable merchants to customize the marketing and sale of their products, thus increasing sales and profit.

The systems and methods disclosed herein can generate data regarding the presentation of identity documents, and can provide indicators of past fraudulent use of identity documents. To increase efficiency, indicators can be created regarding the type, frequency, and location of potentially misused documents. This identifies how, where, and for what purpose particular identity documents are misused and can alert an authority figure in real time of a fraudulent presentation of an identity document.

At least one aspect is directed to a computer implemented method for controlling access via a computer network to a subscriber server. The computer implemented method includes receiving, at a log-in server, a query to connect a computer through the computer network to the subscriber server. The computer implemented method includes receiving, from the computer, registrant identification data, and receiving, from the subscriber server, subscriber server identification data. The computer implemented method evaluates at least one of the registrant identification data and the subscriber identification data to validate the query, and establishes a first session between the computer, the log-in server, and the subscriber server to provide access from the computer to at least a portion of a website associated with the subscriber server. The first session provides this access based in part on the registrant identification data and the subscriber identification data.

At least one aspect is directed to an access control system in a computer network. The access control system includes a subscriber server and a log-in server. The log-in server is configured to receive a query to connect a computer to the subscriber server. The log-in server is further configured to receive registrant identification data and to receive subscriber server identification data. The log-in server can evaluate at least one of the registrant identification data and the subscriber server identification data, and the log-in server can establish a first session between the computer and at least one of the subscriber server and the log-in server in response to the query to provide access from the computer to content associated with at least one of the subscriber server and the log-in server.

At least one aspect is directed to a computer implemented method for controlling access via a computer network to a subscriber server. The method can receive, at a log-in server, a query to connect a computer through the computer network to the subscriber server. The method can receive, at the log-in server and from the computer, registrant identification data. The registrant identification data can include information that identifies categories of content that the computer is authorized to access through the computer network. The registrant identification data can also include identity document data of at least one document. The method can receive, from the subscriber server, subscriber server identification data. The subscriber server identification data can include information that identifies categories of content that the subscriber server is configured to make available via the computer network. The method can store at least one of the registrant identification data and the subscriber server identification data in at least one database associated with the log-in server, and can evaluate, by the log-in server, at least one of the registrant identification data and the subscriber identification data. The method can establish, by the log-in server, a first session between the computer, the log-in server, and the subscriber server to provide, based in part on the registrant identification data and the subscriber identification data, access from the computer to at least a portion of a website associated with the subscriber server.

In some embodiments, the subscriber server identification data identifies a user. For example, in connection with an identity theft prevention service, the subscriber server identification data can include name data, date of birth data, family identification data, marital data, a government issued identification card or number (including associated data such as eye color or expiration date), a geographic address, income data or employment data.

At least one aspect is directed to an access control system in a computer network. The system includes a subscriber server and a log-in server. The log-in server can receive a query from at least one of the subscriber server and a computer, via the computer network, to connect the computer to the subscriber server. The log-in server can receive from the computer registrant identification data. The registrant identification data can include information that identifies categories of content that the computer is authorized to access via the computer network. The registrant identification data can also include identity document data of at least one document. The log-in server can receive subscriber server identification data from the subscriber server. The subscriber server identification data can include information that identifies categories of content that the subscriber server is configured to make available via the computer network. The log-in server can store at least one of the registrant identification data and the subscriber server identification data in at least one database associated with the log-in server, and can evaluate at least one of the registrant identification data and the subscriber server identification data. The log-in server can establish a first session between the computer and at least one of the subscriber server and the log-in server in response to the query to provide access from the computer to content associated with at least one of the subscriber server and the log-in server.

At least one aspect is directed to a computer implemented method for controlling access via a computer network to a subscriber server. The method can receive, at a log-in server, a query to connect a computer through the computer network to the subscriber server, and receiving, at the log-in server and from the computer, registrant identification data. The registrant identification data includes information that identifies categories of content that the computer is authorized to access through the computer network and identity document data of at least one document. The method can receive, from the subscriber server, subscriber server identification data. The subscriber server identification data can include information that identifies categories of content that the subscriber server is configured to make available via the computer network. The method can evaluate, by the log-in server, at least one of the registrant identification data and the subscriber identification data. The method can establish, by the log-in server, a first session between the subscriber server and at least one of the log-in server and the computer to provide, based in part on the registrant identification data and the subscriber identification data, access from the computer to at least one of the subscriber server and the log-in server to access identify theft prevention service data indicative of an identity status of at least one of a user associated with the computer and a subscriber entity associated with the subscriber server.

At least one aspect is directed to a computer implemented method for identifying improper use of an identity document. The computer implemented method receives, from a first subscriber, information related to the identity document, and stores the information related to the identity document in a database. The computer implemented method compares the information related to the identity document with prior activity data that is received from a second subscriber, and the prior activity data is stored in the database. The computer implemented method identifies at least one instance of potential identity document misuse, and informs the first subscriber of data identifying potential identity document misuse.

At least one aspect is directed to a system for identifying potentially improper use of an identity document. A processor is configured to receive, from a first subscriber, information related to an identity document. Information related to the identity document can be stored in a database. The processor is configured to compare the information related to the identity document with prior activity data received from a second subscriber. The prior activity data can be stored in the database. The processor is further configured to identify, based on the comparison, at least one instance of potential identity document misuse, and to inform the first subscriber of data identifying potential identity document misuse.

At least one aspect is directed to a computer implemented method for identifying potentially improper use of identity documents as part of an identity theft prevention service. The method can receive, at a server of a fraud data collection platform via a computer network, from a first subscriber server of a first subscriber, information related to an identity document. The method can also receive, at the server, authorization data indicating registration of the first subscriber with an identity theft prevention service. The method can store the information related to the identity document in a database, and can perform a comparison of the information related to the identity document with prior activity data related to use of the identity document. The prior activity data can be received by the server from a second subscriber registered with the identify theft prevention service, and the prior activity data can be stored in the database. The method can identify, based on the comparison, at least one instance of potential identity document misuse. The method can inform, based at least in part on the authorization data, at least one of the first subscriber, the second subscriber and a third subscriber registered with the identify theft prevention service of data identifying the at least one instance of potential identity document misuse via a communication session established between the fraud data collection platform and at least one of the first subscriber server associated with the first subscriber, a second subscriber server of the second subscriber, and a third subscriber server of the third subscriber.

At least one aspect is directed to a system for identifying potentially improper use of an identity document via a computer network as part of an identity theft prevention service. The system can include a fraud data collection platform having at least one server and at least one database. The fraud data collection platform can receive, from a first subscriber of a first subscriber, during at least one communication session via the computer network between the fraud data collection platform and a subscriber server of the first subscriber, information related to the identity document, and authorization data indicating registration of the first subscriber with an identity theft prevention service. The fraud data collection platform can store at least one of the information related to the identity document and the authorization data in the database, and can perform a comparison of the information related to the identity document with prior activity data related to use of the identity document and received from a second subscriber registered with the identity theft protection service. The fraud data collection platform can identify, based on the comparison, at least one instance of potential identity document misuse, and can inform, based at least in part on the authorization data, at least one of the first subscriber, the second subscriber, and a third subscriber of the identity theft prevention service, of data identifying the at least one instance of potential identity document misuse.

At least one aspect is directed to a computer readable storage medium having instructions to provide information via a computer network. The instructions can comprise instructions to receive, from a first subscriber via the computer network, information related to the identity document and authorization data indicating registration of the first subscriber with an identity theft prevention service, and to store at least one of the information related to the identity document and the authorization data in the database. The instructions can comprise instructions to perform a comparison of the information related to the identity document with prior activity data related to use of the identity document and received from a second subscriber registered with the identity theft protection service, and to identify, based on the comparison, at least one instance of potential identity document misuse. The instructions can comprise instructions to inform, based at least in part on the authorization data, at least one of the first subscriber, the second subscriber, and a third subscriber of the identity theft prevention service, of data identifying the at least one instance of potential identity document misuse. The computer readable storage medium can be non-transitory. The computer readable storage medium can be a tangible storage medium.

At least one aspect is directed to a computer implemented method for providing a plurality of potential survey participants. The computer implemented method receives a request from a subscriber to be included in a survey pool, and receives personal data associated with the subscriber. The computer implemented method validates the personal data, creates a subscriber profile, and stores the subscriber profile in a database. The computer implemented method receives a survey request that includes survey criteria from a survey commissioner, and identifies the subscriber as a potential survey participant based at least in part on a comparison of the subscriber profile and the survey criteria. The computer implemented method generates a survey recipient list responsive to the survey request, and the survey recipient list includes the potential survey participant.

At least one aspect is directed to a system for providing a plurality of potential survey participants. A processor is configured to receive a request from a subscriber to be included in a survey pool, and to receive personal data associated with the subscriber. The processor is further configured to validate the personal data and to create a subscriber profile based at least in part on the subscriber data. A database associated with the processor can store the subscriber profile. The processor is further configured to receive a survey request from a survey commissioner, and the survey request can include survey criteria. The processor is configured to identify the subscriber as a potential survey participant based at least in part on a comparison of the subscriber profile and the survey data. The processor is further configured to generate a survey recipient list. The survey recipient list can be responsive to the survey request, and can include the potential survey participant.

In various embodiments, the systems and computer implemented methods may redirect a query from the subscriber server to the log-in server, and may prompt a computer for a session password. Access to content associated with a subscriber server may be restricted or blocked based on registrant identification data, and the registrant identification data may be matched with data stored in a database. A second session may be established between a log-in server and a computer to block access to content associated with a subscriber server. Feedback data received from a second computer through a computer network may be evaluated to determine of a session is to be established between a computer, a log-in server, and a subscriber server to provide access from the computer to content associated with a subscriber server.

These aims and objects are achieved by the methods and systems according to independent claim 1 and any other independent claims. Further details may be found in the remaining dependent claims.

Other aspects and advantages of the systems and methods disclosed herein will become apparent from the following detailed description, taken in conjunction with the accompanying drawings, illustrating the principles of the systems and methods described herein by way of example only.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
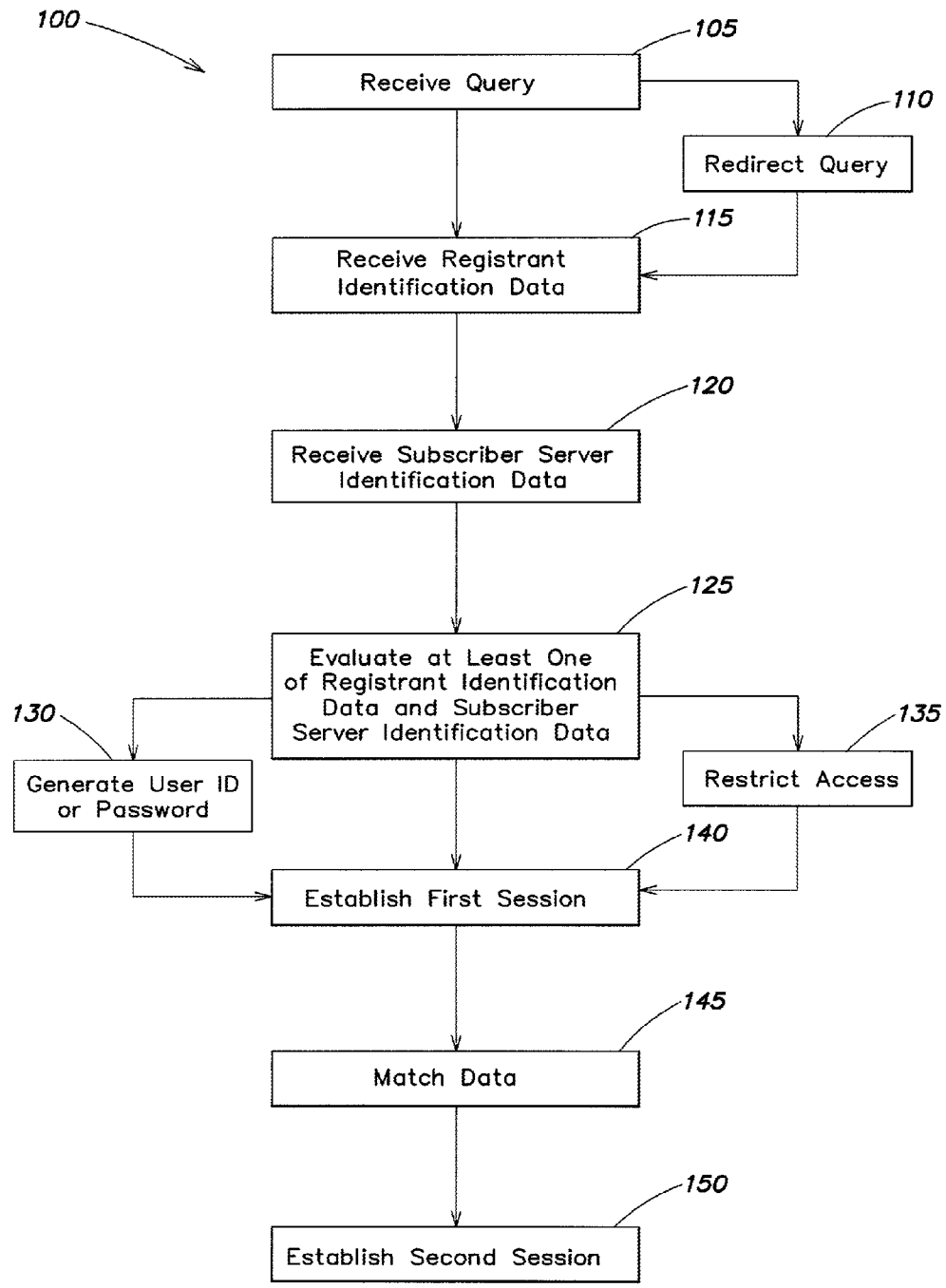
FIG. 1 is a flow chart depicting a computer implemented method for controlling access to content provider data in accordance with an embodiment.

The systems and methods described herein are not limited in their application to the details of construction and the arrangement of components set forth in the description or illustrated in the drawings. The systems and methods described herein are capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

As shown in the drawings for the purposes of illustration, the systems and methods described herein may be embodied in computer implemented systems and methods for controlling access to a subscriber server over a computer network. Users associated with a log-in server and content providers associated with a subscriber server can register with a service that controls and regulates user access to information such as a web page made available by a content provider. Embodiments of the computer implemented systems and methods disclosed herein can restrict user access to at least a portion of the data made available by the content provider.

As further shown in the drawings for the purposes of illustration, the systems and methods described herein may be embodied in computer implemented systems and methods for identifying improper use of an identity document. Information received from an authority figure evaluating an identity document may be evaluated in conjunction with data related to past use of the identity document to generate an indication of the authenticity of the identity document or the veracity of its use. Embodiments of the computer implemented systems and methods disclosed herein can provide real time data identifying potential identity document misuse and alerting an authority figure presented with an identity document.

As further shown in the drawings for the purposes of illustration, the systems and methods described herein may be embodied in computer implemented systems and methods for providing a plurality of survey participants. Potential survey participants create a customized profile and avail themselves to merchants seeking to perform a survey. Embodiments of the computer implemented systems and methods disclosed herein receive a survey request and identify at least one potential participant particularly suited to participate in the survey.

In brief overview, FIG. 1 is a flow chart depicting a computer implemented method 100 for controlling access to content provider data. Method 100 may include the act of receiving a query (ACT 105). In one embodiment, receiving a query (ACT 105) can include receiving, at a log-in server, a query to connect a computer with a subscriber server so that, for example, a computer user may access content associated with the subscriber sever. For example, receiving a query (ACT 105) may include receiving a query at a log-in server to connect a computer with a subscriber server through a computer network, where the computer network includes both the log-in server and the subscriber server.

In one embodiment, receiving a query (ACT 105) includes receiving an attempt, by for example a user of the computer, to access a web page via the Internet. For example, an unsupervised minor may be attempting to access an adult-content website by entering a domain name into a web browser, or by clicking on a link. This query or request may then be received (ACT 105) by a log-in server that may be associated with a third party service provider. In one embodiment, a query may be received at a subscriber server associated with content that is the subject of the query, and then forwarded to a log-in server, where it can be received (ACT 105).

In one embodiment this log-in server may be a different server than the subscriber server where the content that is the subject of the query is located. For example, a user query such as a request to access data that is associated with a first server (e.g., a subscriber server) may be received (ACT 105) at a second server (e.g., a log-in server) whose purpose generally includes authorizing, denying, or authorizing in part the log-in query.

Computer implemented method 100 may include the act of redirecting the query (ACT 110). For example a user of the computer may intend to access content associated with a subscriber server. In this example, the user may query or direct the computer to connect to the subscriber server through a network. However, the query directed to the subscriber server may be redirected (ACT 110) from the subscriber server to a log-in server. In one embodiment the query may be intercepted and redirected (ACT 110) so that it does not reach subscriber server. In one embodiment the computer where the query originated may display a message indicating that the query has been redirected (ACT 110) or is otherwise being processed or validated. In another embodiment, the computer may not display any message indicating a status of the query or where the query has been received, so that a user may be unaware the query has been redirected from the subscriber server to the log-in server (ACT 110).

Computer implemented method 100 may include the act of receiving registrant identification data (ACT 115). In one embodiment, registrant identification data from the computer where the query originated may be received (ACT 115) at the log-in server. Registrant identification data of a computer associated with a query to connect to a subscriber server may first travel to the subscriber server before being forwarded to the log-in server, where it is received (ACT 115). In another embodiment the registrant identification data associated with the query may be received (ACT 115) at the log-in server without having passed through the subscriber server through a computer network such as the Internet. Registrant identification data may be received (ACT 115) either together with or separate from receipt the query (ACT 105).

For example, a minor using a home computer may attempt to access a web page available on the Internet by transmitting a query to connect to a subscriber server that includes memory where the data constituting that web page may be stored. This query may be received (ACT 105) at a login server, and registrant identification data may also be received (ACT 115) at the log in server. In one embodiment, the log-in server may also receive registrant identification data (ACT 115) that includes data associated with, for example, the home computer or potential users of the home computer. For example, registration data may be received (ACT 115) that identifies the origin of the query and related information regarding an account associated with the origin of the query. In one embodiment, registrant identification data may identify a computer where the query originated as a computer that may be used by minors. Registrant identification data may be pre-transmitted, associated with an established account, provided by a user with the query, or separately received subsequent to the query, for example. In one embodiment, a log-in server may receive registrant identification data (ACT 115) that, for example, a user has entered into a computer, that is stored in a database accessible by the log-in server, or that corresponds to an account associated with the computer that is being accessed by the user.

Receiving registrant identification data (ACT 115) can include receiving Identity Theft Registration Service (ITPS) data as part of an ITPS system described herein. For example, received registrant identification data can include document data of at least one document. In one embodiment, the log-in server receives registrant identification data (ACT 115) that includes information identifying categories of content that a computer is authorized to access, well as identity document data of at least one document. The received identity document data can include or be received with additional registration data used by the log-in server to generate a subscriber account as part of an identity theft prevention service. For example, the log-in server can be part of a fraud data collection platform that establishes communication sessions between at least two subscriber servers or other computing devices.

Computer implemented method 100 may include the act of receiving subscriber server identification data (ACT 120). Receiving subscriber server identification data (ACT 120) may include receiving identification data from a subscriber server. In one embodiment, receiving subscriber server identification data (ACT 120) includes receiving an indication of subscriber server data content. For example, receiving subscriber server identification data (ACT 120) may include receiving an indication that the subscriber server provides material suitable for minors. Alternatively, receiving subscriber server identification data (ACT 120) may include receiving an indication that at least some content associated with the subscriber server may be inappropriate for minors. Receiving subscriber server identification data (ACT 120) may include receiving data specifying that subscriber server content relates to graphic news events, violence, adult imagery, children's programming, sports, educational services, entertainment, or other categories of information. In one embodiment, the received subscriber server identification data (ACT 120) includes data used by the log-in server to register a subscriber (e.g., company, person, institution, or organization) with an identity theft prevention service operated at least in part by the log-in server, for example as part of a fraud data collection platform.

Subscriber server identification data may be received (ACT 120) when a content provider associated with the subscriber server registers with a provider associated with the log-in server. For example, a merchant or other subscriber entity associated with the subscriber server may join a service that controls access to server content on computer networks. In one embodiment, subscriber server identification data may be received (ACT 120) when joining this service. For example, subscriber server identification data may be received (ACT 120) and stored in a database prior to receipt of the query (ACT 105). It should be appreciated that method 100 may receive a query (ACT 105), receive registrant identification data (ACT 115), and receive subscriber identification data (ACT 120), however the order in which this data and query are received may vary. For example, registrant identification data identifying which types of content a computer may access, and subscriber server identification data identifying which types of content a subscriber server contains, may both be received (ACT 115, ACT 120) at various times and stored in a database. Continuing with this illustrative embodiment, a query to connect the computer to the subscriber server may be received (ACT 105) subsequently. In one embodiment, a log-in server may receive subscriber server identification data (ACT 120) from, for example, the subscriber server, from a database accessible by the log-in server, or from an account associated with the subscriber server.

In one embodiment, when method 100 has performed at least one of the acts of receiving a query (ACT 105), receiving registrant identification data (ACT 115), and receiving subscriber server identification data (ACT 120), method 100 may include the act of evaluating at least one of the registrant identification data and the subscriber identification data (ACT 125). In one embodiment, this data evaluation (ACT 125) includes validating the query, e.g., by determining if the computer is authorized to access at least some data that can be provided by the subscriber server.

For example, the act of receiving registrant identification data (ACT 115) may include receiving data indicating that a computer may access any content on any server without restrictions, and the act of receiving subscriber server identification data (ACT 120) may include receiving data indicating that a subscriber server provides some content that may be inappropriate for children under, for example, 13 years of age. In this illustrative embodiment, evaluating the data (ACT 125) can include validating the query from the computer to connect to the subscriber server. For example, this may include authorizing access to any content on the subscriber server.

In another exemplary embodiment, the act of receiving registrant identification data (ACT 115) may include receiving data indicating that a computer is not authorized to access any adult-oriented content, and the act of receiving subscriber server identification data (ACT 120) may include receiving data that some web pages of a website associated with the subscriber server include pornographic images. In this illustrative embodiment, evaluating the data (ACT 125) can include validating the query from the computer to authorize the computer to access only the web pages of a website that do not include any pornographic images.

Evaluating at least one of the registrant identification data and the subscriber server identification data (ACT 125) may include comparing the registrant identification data and the subscriber server identification data, as well as processing or analyzing either the registrant identification data or the subscriber server identification data to determine if the query is valid, partially valid, or invalid. In one embodiment, in an ITPS platform, this data evaluation (ACT 125) can include access (by the log-in server) to and evaluation of publically available databases to confirm the identity of any user or subscriber.

Computer implemented method 100 may include the act of generating at least one of a session user identification (ID) and a session password (ACT 130). In one embodiment, generating a session user ID or a session password includes prompting the computer for a session user ID or a session password. For example, an evaluation of the data (ACT 125) may indicate that a password, username, or other form of user identification is required to access a subscriber server having certain content. In one embodiment, for example, the query may be partially validated so that the computer where the query originated may access some, but not all, of the content associated with the subscriber server. In this illustrative embodiment, computer implemented method 100 may proceed by prompting the computer where the query originated for a password (ACT 130). In various embodiments, a log-in server may connect to the computer over a computer network and transmit a message to the computer requesting the password, which may be required to access at least some of the content of a subscriber server.

For example, a child may direct a computer to transmit a query to access content from a subscriber server. The query may be received (ACT 105). In one embodiment, registrant identification data and subscriber server identification data have previously been received (ACT 115, ACT 120) and stored in a database associated with a log-in server. Continuing with this illustrative embodiment, the registrant identification data may include data requiring a password to access graphic material, and the subscriber server identification data may include data indicating that the subscriber server can provide access to some graphic material. In this example, generating a session ID or password (ACT 130) may include the act of prompting the computer for a session user identifier or password, which may be known, for example, to the child's guardian and not to the child, thus effectively barring the child from material deemed inappropriate.

In one embodiment where generating a session password (ACT 130) includes the act of prompting for a session password, the prompting (ACT 130) may occur in response to receiving the query (ACT 105). For example, a log-in server may identify the computer in a computer network associated with the query to access subscriber server content. This computer where the query originated may be associated with an account that can be monitored at the log-in server. The account may include a requirement that a password be generated to access certain data over a computer network, such as a website or a particular web page of a web site, or other data available over a computer network. Prompting for a session password (ACT 130) may include generating a novel password in response to each query, generating a generic password for any query, or a combination thereof. In various embodiments, prompting for a password (ACT 130) may depend on other factors as well, such as the subject matter of the content that is the subject of the query, or the data or time that the query was made or the location from which the query was made.

Computer implemented method 100 may include the act of restricting access to at least a portion of content associated with the subscriber server (ACT 135). For example, restricting access (ACT 135) may include restricting access to at least a portion of a website associated with the subscriber server. Restricting access to subscriber server content (ACT 135) may include restricting access to subscriber server content based on results obtained evaluating at least one of registrant identification data and subscriber server identification data (ACT 125). In one embodiment, restricting access to subscriber content (ACT 135) may be in response to a failure to receive a password, or receipt of an incorrect password. In one embodiment, restricting access to subscriber server content (ACT 135) includes directing the computer to a web page associated with the subscriber server that displays a message stating, for example "Access Denied" or the like. In one example of this embodiment, subscriber servers that join a computer network access control service that includes a log-in server may be required to have an "Access Denied" type web page associated with a subscriber server. In an alternate embodiment, a generic "Access Denied" type web page may be provided by the log-in server.

Computer implemented method 100 may include the act of establishing a first session (ACT 140). In one embodiment, establishing a first session (ACT 140) includes establishing a first session between any of the computer, the log-in server and the subscriber server. Establishing the first session (ACT 140) generally includes enabling communication between the computer and the subscriber server, or between the subscriber server and the log-in server over a computer network. For example, establishing a first session (ACT 140) may enable the computer to access subscriber server content. In one embodiment of this example, establishing a first session (ACT 140) can include establishing a session between the computer and the subscriber server via the log-in server. It should be appreciated, however, that in one embodiment, establishing a first session (ACT 140) includes establishing a session between the computer where the query originated and the subscriber server where the session path does not include the log-in server. Data transmitted between these components can be logged (by the log-in server and database) and used to generate reports or feedback regarding the status of the requests to the ITPS service, to generate alerts regarding the authentication or refusal to authenticate a user or subscriber, or to update user or subscriber profiles, accounts, or risk scores.

In one embodiment, establishing a first session (ACT 140) can include establishing a session between the computer, the log in server, and the subscriber server to provide access from the computer to content, (e.g., at least a portion of a website) associated with the subscriber server. The first session may be established (ACT 140) based in part on the evaluation (ACT 125) of at least one of the registrant identification data and the subscriber identification data. For example, registrant identification data may be associated with a computer that is seeking access to a website where a user query to view the website has been input into the computer. The registrant identification data may include data authorizing or restricting access to particular content associated with the subscriber server, such as a particular website. Establishing the first session (ACT 140) between the computer, the log-in server and the subscriber server may include establishing a session in order to provide to the computer an indication as to whether or not the query will be satisfied. For example, establishing a first session (ACT 140) may, but need not, provide access that is fully responsive to the query, e.g., allow a computer to access a requested website in its entirety. In one embodiment, establishing a first session (ACT 140) includes providing an indication to the computer where the query originated that the query has been partially or entirely denied. For example, a query to access a website may be received (ACT 105) and registrant identification data or subscriber identification data may be evaluated (ACT 125).

Evaluating relevant data (ACT 125) may result in a determination that the query is invalid, e.g., the query cannot be satisfied because the query requests access to subscriber server content that, for example, the registrant identification data indicates is prohibited from display on the computer. In this example, establishing a first session (ACT 140) can include establishing a session that connects the computer with at least one of the subscriber server and the log-in server to provide to the computer an indication that the query is improper and has been denied. For example, establishing a first session (ACT 140) can enable the display of a message such as "Access Denied" to appear on the computer where the query originated. It should be appreciated that in various embodiments, establishing a first session (ACT 140 may include establishing a session to enable the provision of all, none, or any portion of subscriber server content to the computer. This may include, for example, allowing the computer to access some web pages of a website, but block access to other web pages of the same web site.

Generally, establishing a first session (ACT 140) enables a permitted scope of computer access to subscriber server content in response to a query. In one embodiment, establishing a first session (ACT 140) includes establishing a session between the computer and either the log-in server or the subscriber server to request entry of a password, or to display an indication that access to subscriber server content will not be granted.

Computer implemented method 100 may include the act of matching the registrant identification data with data included in a database (ACT 145). For example, a computer may provide registrant identification data to, for example, the log-in server. This registrant identification data may identify the computer by, for example, account number, location, owner name, address, or the IP address of the computer. In one embodiment, matching the registrant identification data can include identifying additional data associated with the computer from a database. The database may contain, for example, information identifying the types of content that the computer is authorized to access.

It should be appreciated that in one embodiment, registrant identification data itself may include information identifying which categories of content the associated computer is authorized to access. This may include, for example, white lists, black lists, meta tag data, or categories of subject matter that can be either authorized or prohibited. In this example, matching the registrant identification data with data included in a data base may, but need not, occur.

The registrant identification data can also include identity document data of at least one document. For example, the log-in server can receive registrant identification data about a government issued, public, employer, virtual, or private identification card. This data can include the identity of the authorized card holder, identification numbers, or data about the identity card such as security features or expiration dates. In one embodiment, the method 100 (and system 200 discussed herein) are part of an identity theft prevention service to authenticate subscriber identity credentials based at least in part on the identity document data. The registrant identification data, including the information identifying categories of content that a computer (e.g., subscriber server) is authorized to access as well as the identity document data and the subscriber server identification data can be stored in at least one database.

Computer implemented method 100 may include the act of establishing a second session (ACT 150). In one embodiment, computer implemented method 100 establishes a second session between the computer and at least one of the log-in server and the subscriber server to block access to content associated with the subscriber server. For example, establishing a first session (ACT 140) may enable the computer from which the query was received (ACT 105) to access content via the subscriber server. In one embodiment, the content can include a web page from a website, where the content of the web page, as reported in the subscriber server identification data that was received (ACT 120), does not offend any restrictions included in the registrant identification data that was received (ACT 115). It should be appreciated that receiving the registrant identification data (ACT 115) can include receiving an indication of allowable or objectionable content from the computer or from a database that may be associated with the log-in server.

Continuing with this example, a computer may have access to a web page associated with a subscriber server in satisfaction of the query. In one embodiment of this example, a second web page, for example from the same website, may be associated with the same subscriber server but may contain content deemed in the registrant identification data to be prohibited. In one embodiment, establishing a second session (ACT 150) may occur in response to receipt of a query to access the second page. Because in this embodiment, the computer is prohibited from accessing the second web page, establishing a second session (ACT 150) may include establishing a session between the computer and at least one of the log-in server and the subscriber server to, for example, prompt the computer for a password, or to provide to a computer an indication that access to the second web page associated with the subscriber server is denied. In various embodiments, establishing a second session (ACT 150) can include enabling computer access to subscriber server content, prohibiting computer access to subscriber server content, or enabling computer access to a subset of subscriber server content based, for example, on registrant identification data that may include data identifying permissible and impermissible content that the associated computer may access.

Establishing a second session (ACT 150) may authorize access to at least a portion of a website associated with the subscriber server based at least in part on, for example, registrant identification data or a session password. In one embodiment, establishing a second session (ACT 150) can include denying access to content associated with a subscriber server that, for example, was the subject of a query received at the log-in server (ACT 105). In another embodiment, establishing a second session (ACT 125) grants access to content associated with the subscriber server, (e.g., grants a user request to view a website or particular web page.)

Figure 2:
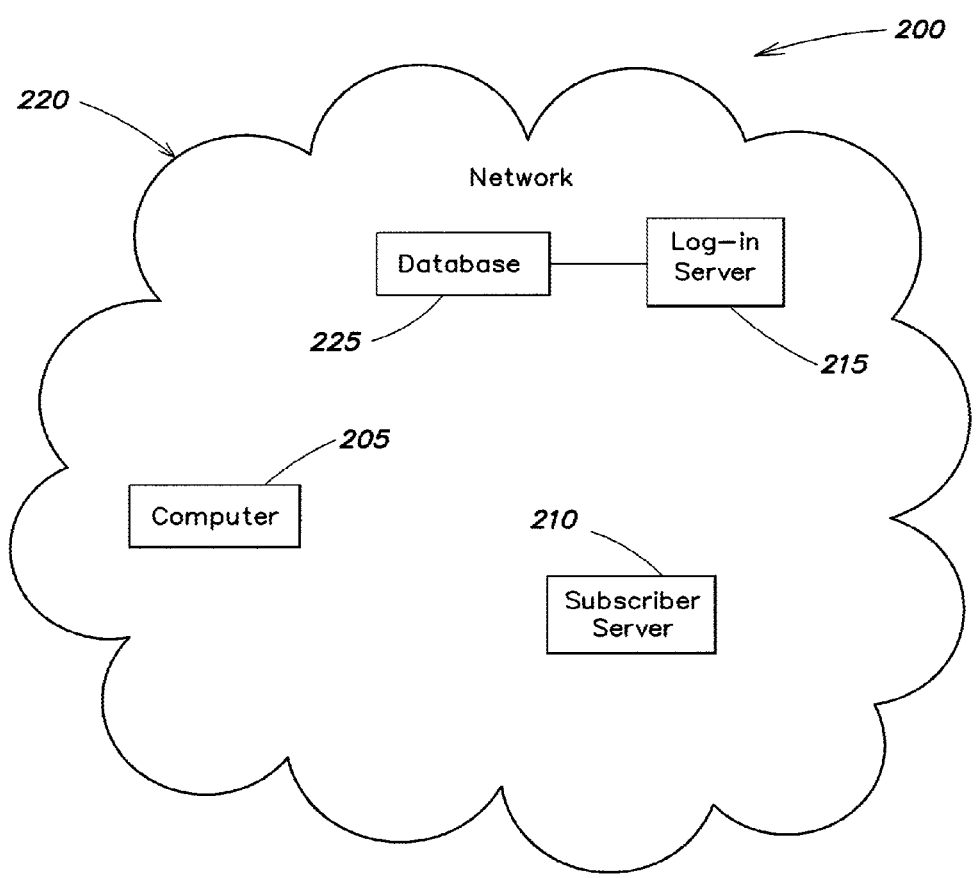
FIG. 2 is a block diagram of a computer networked access control system in accordance with an embodiment.

In brief overview, FIG. 2 is a block diagram of a computer networked access control system 200 in accordance with an embodiment of the systems and methods described herein. System 200 may include at least one computer 205, at least one subscriber server 210, and at least one log-in server 215 capable of data communication via at least one network 220. Computer 205 may include any generally purpose computer, such as a personal computer having sufficient processing power and memory storage capability to perform the relevant operations as disclosed herein. Subscriber server 210 may include a web server. In one embodiment, subscriber server 210 can include any computer that runs a computer program to accept, for example, hypertext transfer protocol (HTTP) requests from, for example, computer 205, log-in server 215, or other clients associated with network 220.

Log-in server 215 may include a computer or other device that can run an application or perform services for clients such as, for example, subscriber server 210 or computer 205 that can connect to log-in server 215 via network 220. In one embodiment, log-in server 215 includes an application server or other software engine that delivers applications to one or more of computer 205 and subscriber server 210 via network 220. For example, log-in server 215 can deliver applications to computer 205 or subscriber server 210 over a network 220 such as the Internet using HTTP.

In one embodiment, log-in server 215 can be configured to receive a query to connect computer 205 with subscriber server 210. The query may include, for example, a request to access content associated with subscriber server 210 (e.g. data such as a website or web page of a website.) For example, a user may direct computer 205 to access content associated with or provided by subscriber server 210, such as a particular website. The user may then direct computer 205 to transmit a query, intended for subscriber server 210 that requests access to the website. This may include, for example, entering a domain name into a web browser of a software program running on computer 205. In various embodiments, log-in server 215 can receive this query directly from computer 205 via network 220, or the query may be received by subscriber server 210 and forwarded from subscriber server 210 to log-in server 215.

In one embodiment, log-in server 215 is configured to receive registrant identification data. Registrant identification data generally includes data associated with computer 205. For example, registrant identification data may include data identifying computer 205 by, for example, any of a username, location, category, Internet Protocol (IP) address, or the like. In one embodiment, registrant identification data includes information related to types of content that computer 205 is authorized to access from any other computer or server, via network 220. For example, registrant identification data may include information restricting computer 205 access to content suitable for minors, such as educational content, or sports content, for example. Registrant identification data may also include identity document data of at least one identity document.

Registrant identification data may include meta tags or other keywords and instructions that computer 205 is not to receive or display any content such as a website that includes these blacklisted keywords or meta tags. Registrant identification data may also include white list data such as meta tags or keywords associated with content that computer 205 is authorized to receive or display. Registrant identification data may include information authorizing computer 205 to access or display content from any server associated with network 220 without restriction, and in one embodiment, registrant identification data may include information restricting computer 205 access to one or more individual websites, identified for example by domain name. It should be appreciated that registrant identification data may include data identifying a computer, and identifying data or categories of data that a computer may or may not receive. For example, registrant identification data can identify computer 205, and include information stating that computer 205 is not to receive material deemed to be graphic, obscene, violent, or otherwise inappropriate.

Registrant identification data may include data identifying a user of computer 205 by a username. For example, if computer 205 accesses a social networking website associated with subscriber server 210, registrant identification data including a username may be used to identify the user to other users of the social networking website. In another embodiment, registrant identification data may include data requesting that a user of computer 205 remain anonymous, so that a username is not revealed to, for example, a social networking website associated with subscriber server 210.

In one embodiment log-in server 215 receives a query to connect computer 205 to subscriber server 210. Log-in server 215 may also receive registrant identification data associated with computer 205. Log-in server 215 may receive the registrant identification data concurrently with the query, or subsequent to the query. In one embodiment log-in server 215 can prompt computer 205 for registrant identification data. In another embodiment, log-in server 215 can retrieve at least a portion of the registrant identification data from at least one associated database 225. In various embodiments, log-in server 215 can receive the query, the registrant identification data, or both from any combination of at least one of computer 205, subscriber server 210, and database 225.

In one embodiment, log-in server 215 is configured to receive subscriber server identification data. For example, log-in server 215 may receive subscriber server identification data from subscriber server 210, or from database 225. Subscriber server identification data generally identifies subscriber server 210 and the content that it may make available to computer 205. For example, subscriber server identification data may include meta tags, keywords, or other descriptors that indicate the content of a website associated with at least one subscriber server 210. In one embodiment, subscriber server identification data may include a rating system, where the content associated with subscriber server 210 is rated as suitable for everyone, children, teenagers, or adults, for example. In this illustrative embodiment, registrant identification data may identify computer 205 as a computer authorized to receive content with certain ratings, such as content rated suitable only for everyone or children, for example.

In one embodiment, log-in server 215 can be part of a paid service. For example, an owner of computer 205 may establish an account with a service provider associated with log-in server 215. The account can identify at least one computer 205, and can include registrant identification data that restricts computer 205 access to content over network 220. The account including any registrant identification data can be stored, for example in database 225 or in computer 205. When, for example, computer 205 attempts to access content over network 220, log-in server 215 can determine if computer 205 is authorized to receive the content computer 205 is attempting to access.

In one embodiment, a content provider associated with subscriber server 210 can also establish an account with the service provider associated with log-in server 215. For example, subscriber server 210 may provide subscriber server identification data to log-in server 215 that informs log-in server 215 of the type of content that is associated with subscriber server 210. For example, log-in server 215 may receive data from subscriber server 210 indicating that it is associated with, for example, gambling, content that may be graphic, violent, obscene, educational, cultural, or informative (e.g., current events or news related content). In one embodiment, log-in server 215 may receive subscriber server identification data that identifies at least one subscriber server 210 and indicates rating for its associated content, such as a rating indicating the content is suitable for everyone, children, teens, minors, or adults.

In one embodiment, log-in server 215 can receive subscriber server identification data from at least one subscriber server 210. This data may be stored in database 225. In one embodiment, log-in server 215 may contact subscriber server 210 to retrieve subscriber server identification data, with or without the knowledge or consent of subscriber server 210.

When log-in server 215 receives a query requesting a connection between computer 205 and subscriber server 210, log-in server 215 may be tasked with determining if computer 205 is authorized to retrieve the content that is the subject of the query. In one embodiment, log-in server 215 is configured to evaluate at least one of the registrant identification data and the subscriber identification data to validate the query. For example, log-in server 215 may receive a query to access content associated with subscriber server 210, (e.g., a query to access a website from computer 205). In this illustrative embodiment, log-in server 215 can receive registrant identification data that may identify the types of content that computer 205 is authorized to access. Log-in server 215 may also receive subscriber server identification data associated with the subscriber server 210 that provides the content that is the subject of the query. The subscriber server identification data may identify the types of content that subscriber server 210 makes available. In one embodiment, the subscriber server identification data includes data for each web page of a web site.

In one embodiment, log-in server 215 is configured to establish a first session between computer 205 and at least one of subscriber server 210 and log-in server 215. For example, log-in server 215 may establish a first session between computer 205 and subscriber server 210 to provide access from computer 205 to content, such as a web page, associated with subscriber server 210. In various embodiments, the first session can include a connection between computer 205 and at least one server such as one or more of log-in server 215 and subscriber server 210. For example the first session may enable computer 205 to access and display a web page or other content associated with subscriber server 210 in full or partial satisfaction of the query.

The first session may, but need not, include a session that complies with the request for access to subscriber server 210 content as indicated in the query. For example, log-in server 215 may receive a query to connect computer 205 with a web page associated with subscriber server 210. In one embodiment of this example, log-in server 215 can receive subscriber server identification data indicating that the web page that is the subject of the query includes content that may be considered pornographic. In this illustrative embodiment, log-in server 215 may also receive registrant identification data stating that computer 205 is prohibited from accessing any content that may be considered pornographic. Continuing with this example, log-in server 215 may create, establish, or join a session with computer 205. This session may include information stating that the query to connect computer 205 is denied, or will not be granted in part or in its entirety, for example.

In one embodiment, log-in server 215 can establish a first session between computer 205 and at least one of subscriber server 210 and log-in server 215 in response to the query. The first session may satisfy the query by providing computer 205 with access to the desired content, from for example subscriber server 210, or may reject the query by providing computer 205 with access to a message, from for example log-in server 215, stating that access to the desired content is denied. In various embodiments, the first session can provide access from computer 105 to content associated with at least one of log-in server 215 and subscriber server 210.

In one embodiment, log-in server 215 establishes the first session between computer 205 and log-in server 215 for log-in server 215 to process one or more identity documents as part of an identity theft protection service. In this example, log-in server 215 enables a first subscriber to the identity theft protection service to check their own identity status or to check the status of identify checks that another (e.g., third party) subscriber has made on the first subscriber. Further, via the first session between computer 205 and log-in server 215, a user or subscriber can provide an alert to log-in server 215 (and hence to the identity theft protection service) that there is a problem or suspected problem with the subscriber's account. Log-in server 215 can also establish the first session between subscriber server 210 and log-in server 215. In this example log-in server 215 can launch asynchronous batch requests via the network 220 for one or more identity verifications as part of the identity theft protection service, for example, for organizational subscribers.

In one embodiment, log-in server 215 can prompt computer 205 for a password. For example, in response to the receipt of a query to connect computer 205 with subscriber server 210, log-in server 215 may prompt computer 205 for a password. In one embodiment, log-in server 205 can include logic to process at least one of registrant identification data and subscriber server identification data to determine if a password is required for computer 205 access to the content that is the subject of the query. In one embodiment, log-in server 215, can restrict computer 205 access to at least a portion of the content of subscriber server 210. This may be based, for example, on an incorrect or missing password, or on at least one of the registrant identification data and the subscriber server identification data. In one embodiment, the password may include a user photograph, a scan of a user's fingerprint, or other biometric information. The password may also include a user identifier or secret user string that was previously provided from log-in server 215 to computer 205. In one embodiment, log-in server 215 can track received passwords from computer 205 and can identify the location of a particular user based on the location of an IP address of computer 205.

In one embodiment, log-in server 215 can establish a second session between computer 205 and log-in server 215. For example, the second session can block access between computer 205 and content associated with subscriber server 210. In one embodiment of this example, a first session may be established between computer 205 and subscriber server 210 in response to a query for computer 205 to access subscriber server 210 content. This may occur, for example, when registrant identification data and subscriber server identification data coincide so that subscriber server 210 content does not run afoul of any restrictions included in registrant identification data provided from at least one of computer 205 and database 225. In this illustrative embodiment, a first session may enable computer 205 to access a first web page associated with subscriber server 210. In one embodiment, an operator of computer 205 may, for example, click on a link of the first web page in an attempt to access a second web page. A query to this effect may be received by login server 215. In one embodiment, subscriber server identification data may indicate that the second web page includes content that the registrant identification data indicates is impermissible for computer 205. Continuing with this example, a second session may be established between computer 205 and at least one of log-in server 215 and subscriber server 210. The second session may, for example, prompt for a password or indicate that access to the second web page is denied. In one embodiment, where for example subscriber server identification data for the second web page does not violate and restrictions included in registrant identification data, the second session may establish a connection allowing computer 205 access to the second web page.

In one embodiment, the registrant identification data may indicate that computer 205 can only access content that has no graphic or violent imagery, and subscriber server identification data may indicate that subscriber server 210 provides at least some content that includes violent subject matter. In this illustrative embodiment, log-in server 215 can determine what, if any, content of subscriber server 210 can be made available to computer 205 in response to the query. In various embodiments, log-in server 215 can validate all, part, or none of the query to allow computer 205 to access all, part, or none of the content available on subscriber server 210. For example, subscriber server 210 may provide a website having ten web pages. The subscriber server identification data may identify one of the ten web pages as a web page that includes violent and graphic content. In one embodiment, log-in server 215 may deny access or prompt computer 205 for a password if log-in server 215 receives an indication that computer 205 has been directed to access the web page having objectionable content.

In various embodiments, computer implemented method 100 and system 200 provide a third party service that may be joined by users of computer 205 as well as service providers associated with subscriber server 210. In one embodiment, users of computer 205 wishing to access subscriber server content such as a website may do so either anonymously or non-anonymously. In a further embodiment, the functions of log-in server 215 can be transparent to a user of computer 205. For example, when registrant identification data does not conflict with or restrict access to subscriber server identification data, computer 205 may access subscriber server content without receiving notification that registrant identification data was received or evaluated against subscriber server identification data. In one embodiment, log-in server 215 can collect data regarding the activity of computer 205 and may sell this data, or use it to create, for example, user activity reports or other monitoring functions.

In one embodiment, a user of computer 205 may register with a service provider that controls access to subscriber server 210 content. For example, a user of computer 205 may register with an "Enhanced User Authentication and Authorization Service" (EUAS) service provider that provides log-in server 215. An EUAS service provider can be an entity associated with log-in server 215. The EUAS generally includes logic to perform authentication, authorization, and accounting functions, and can establish at least one session between computer 205 and at least one of log-in server 215 and subscriber server 210. Subscribers or other entities may provide information that is received by the EUAS provider (e.g., by log-in server 215.) In one embodiment, this registrant identification data creates a subscriber profile that can be stored in database 225, and may include, for example, names, contact information, addresses, or biometric identification information. This registrant identification data may also include subscriber requested restrictions or policies for website entry and use. For example, these restrictions may communicate limitations to be enforced if log-in server 215 grants computer 205 access to content of subscriber server 210. It should be appreciated that in one embodiment log-in server 215 can deny computer 205 access to content of subscriber server 210, such as a website.

For example, a patient may register his child with an EUAS provider by creating a profile to limit the child's access to, for example, specific named websites, websites having certain characteristics, or websites having certain entry policies, e.g., websites having a notification stating that you must be 18 to enter the website.) Registrant identification data—which can include these limitations—can be received by log-in server 215 and can be stored in database 225. In various embodiments, more than one profile may be created for a single computer 205 and for associated users. For example, a restrictive profile may be created for a child, and a nonrestrictive profile may be created for the parent. Different profiles maintained by log-in server 215 may be assigned different passwords. Registrant identification data may also specify that a user may, interact, for example, on a social networking website, with other users who have created a profile with an EUAS provider. In one embodiment, registrant identification data can include data regarding habits, hobbies, or activities of an end user to be shared with other end users who use the EUAS service. Registrant identification data may be updated by an authorized user at any time.

In one embodiment, log-in server 215 can receive feedback from others who access the same content provided by subscriber server 210. For example, log-in server 215 may receive data provided by a third party stating that a user has acted in an offensive or inappropriate manner. This third party feedback may become part of the registrant identification data for that user and may be used to limit, temporarily suspend, or restrict access to any content made available by any subscriber server 210. In one embodiment, this third party feedback may be available with user information displayed in, for example, a social networking website.

Figure 3:
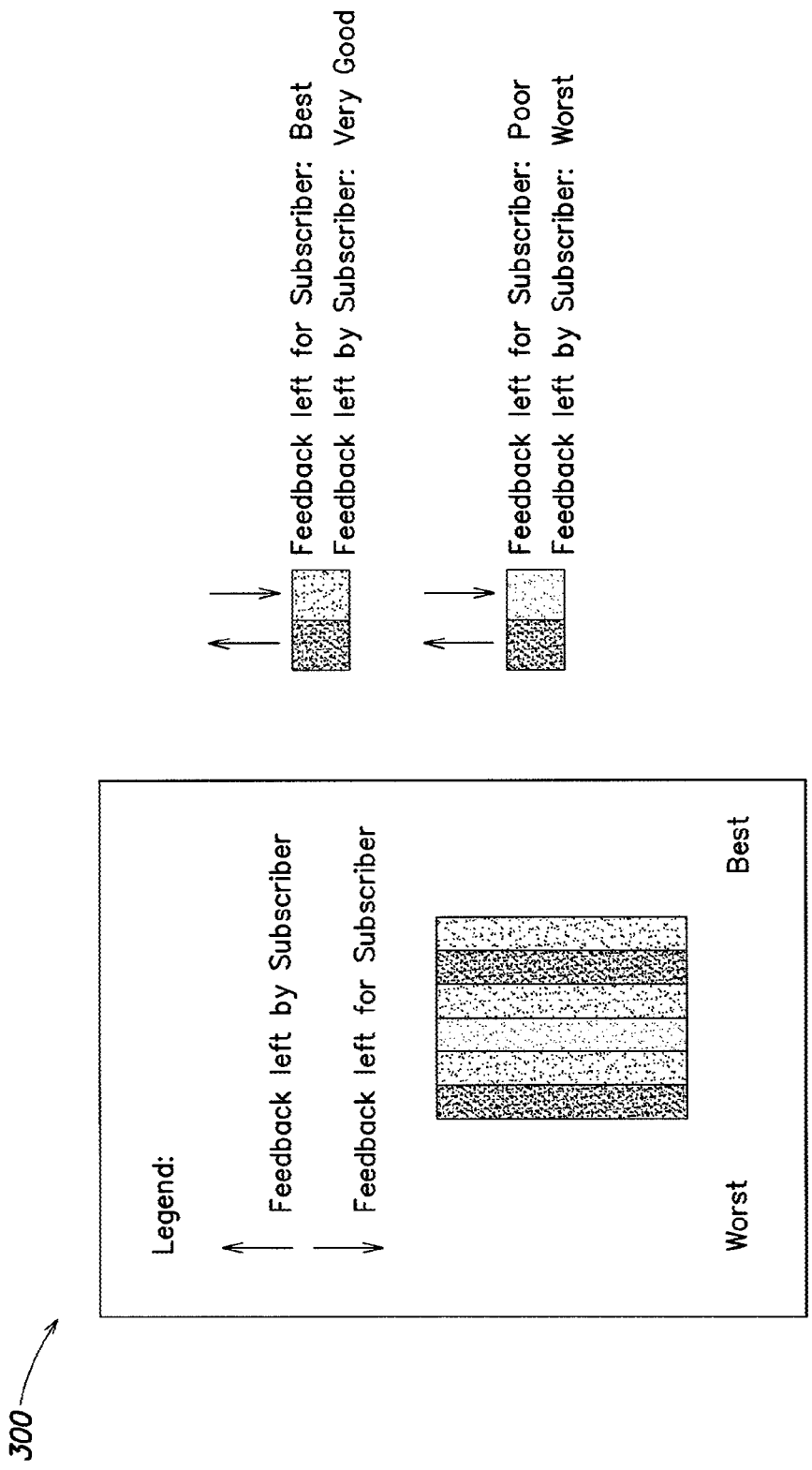
FIG. 3 is a screenshot depicting access control to a content provider based on subscriber ratings in accordance with an embodiment.

For example, a user of EUAS who is accessing a social networking website associated with subscriber server 210 may be presented with a "congeniality award" logo, graph, arrow, or color scheme appearing next to a user name or other profile information, based on the quantity or quality of (e.g., positive, neutral, or negative) third party feedback received by log-in server 215. In one embodiment, profile characteristics of a EUAS user, for example, may be displayed on a social networking website to indicate the number of complaints that user has made about others. For example, a web page of subscriber server 210 may include a link that, when clicked on, connects a user with log-in server 215 so that any additional registrant identification data may be entered and received by log-in server 215. FIG. 3 is a screenshot depicting access control to a content provider in accordance with an embodiment. FIG. 3 generally illustrated an embodiment including a congeniality award representing feedback, given or received, about a user of computer 205. In one embodiment the congeniality award can be displayed on subscriber server 210 after log-in server 215 performs, for example, an Authentication, Authorization, and Accounting (AAA) function on an account associated with the EUAS user.

In one embodiment, anonymous log-in of a user may be authorized at a website associated with subscriber server 210. For example, when computer 205 associated with an EUAS user attempts to access a subscriber website or other content associated with subscriber server 210, an authentication and authorization request can be directed to the EUAS processor, which may include a processor in communication with, but remotely located from, both log-in server 215 and subscriber server 210. Logic associated with log-in server 215 may be accessed from a webpage hosted by subscriber server 210, or from a website that interacts with the EUAS service through a remote communication protocol. After, for example, log-in server 215 logs the user into a registered website associated with subscriber server 210, interactions between computer 205 and the website may proceed normally, without, in this example, any further interaction with log-in server 215.

In one embodiment, when computer 205 requests a log-in to a website or other subscriber server 210 content (for example via log-in server 215 directly, or via a website associated with both log-in server 215 and subscriber server 210), the EUAS service may verify the identity of a user of computer 205 by requesting entry of a password such as a EUAS user-id, The password may consist of a string of alphanumeric digits manually entered by the user. However, the password may also be generated dynamically by using software provided by the EUAS service and associated, for example, with at least one of log-in server 215 and subscriber server 210. In various embodiments, a user may have one or more passwords which they could use at their convenience to access EUAS services from computer 205 via one or more of subscriber server 210 and log-in server 215.

In one embodiment, the EUAS service implemented from, for example, log-in server 215, establishes a protocol specifying the type, format and other particulars of the communication between log-in server 215, computer 205 and, for example, a website. This communication protocol may include control information. The protocol may define how computer 205 users may log-in to a website associated with subscriber server 210 using a log-on ID that may be referred to as a website-log-in ID' and a log-in password that may be referred to as website-PW' specific to, for example, a single website. It should be appreciated that in this embodiment, the website-log-in ID' and website-PW' may be different from the subscriber's EUAS ID and PW, which may be used to access the EUAS service.

For example, when computer 205 accesses a first website, the website-log-in ID' might be "Logi", and when computer 205 accesses a second website, the website-log-in ID' might be "Log 2". In one embodiment, the EUAS service can minimize the number of website-log-in ID's and website-PW's (i.e., "passwords") which EUAS registered end-users need to remember to enter various subscriber websites from computer 205, while providing a secure and private means of accessing these websites.

In one embodiment, the logic associated with log-in server 215 can establish pre-defined communication protocol and associated content with a subscriber server 210, such as a website. This pre-defined protocol may be used to generate, for example, a new website-log-in ID' and website-PW' dynamically each time computer 205 logs in to log-in server 215 to access content from subscriber server 210. This protocol may employ a variety of logic operations, handshake procedures, communication schemes, or encryption procedures, for example. in one embodiment, the website-login-ID' and website-PW' may, but need not, be stored on computer 205, and they can be changed with greater frequency than people normally change their website-login ID's and website-PW's, This generally makes it more difficult to steal a log-in identity of computer 205 using, for example a Trojan horse scheme.

For example, johndoe may be a website-log-in ID' which an end-user, John Doe, may use to access more than one website from computer 205. John Doe may use the same website-PW', such as secret 123, at various websites to avoid having to remember many different PW's. Thus, if someone guesses John Doe's website-log-in ID' and website-PW' at one site, it might be easy for them to try to re-use them to try to gain access to other websites John Doe may access.

In one embodiment, EUAS may provide an automated website-login-ID' and website-PW' service for computer 205 and for websites or other content associated with subscriber server 210. When a dynamic process of generating website-login-ID's and website-PW's is used by EUAS, the end-user may not know the actual website-log-in ID' and website-PW' used to access the website, and the website may not know the end-user's EUAS log-in ID and EUAS log-in PW. In one embodiment, this log-in process by computer 205 to access content of subscriber server 210 may be anonymous. The content of subscriber 210 may include a registered website that is part of a EUAS service. The registered website may only allow access by a user of computer 205 that has been verified by EUAS and meets, for example, pre-defined site entry criteria. In one embodiment where generating website-login ID's and website-PW's may not be entirely automated, a protocol can still be enforced for updating the website-log-in ID' and website-PW' at pre-established intervals.

In one embodiment, log-in server 215 or associated EUAS logic can receive from computer 205 website-log-in ID's and website-PW's for each website of subscriber server 210 that may be managed by log-in server 215. In one example of this embodiment, log-in server 215, which may include EUAS logic, may receive updates from EUAS end-users changing their website-login ID's and website-PW's.

In one embodiment, in addition to website-login-ID's and website-PW's, log-in server 215 can supply information to subscriber server 210 that may include one or more User Pass Strings (UPS). For example, a UPS may include information regarding user-authorization status (e.g., Yes/No Admittance), profile, control, security, or application related information. The log-in server 215 can generate the user pass string based on user identification data obtained (e.g., from the database 225) by the log-in server 215 from subscriber server identification data or from registrant identification data. This information may be passed between computer 205, log-in server 215, and subscriber server 210, and updated as required during the log-in process. Table 1 below includes an example of possible UPS components and associated data elements. In one embodiment, based in part on the application and the subscriber server 210 content, log-in server 215 or associated EUAS logic may select one or more of the data elements shown in Table 1 and may concatenate them to form a UPS that may be forwarded to subscriber server 210 content such as a website.

Sample User-Pass-String=(EUAS-Anon_LOG-IN_ID, EUAS-Anon_LOG-IN_PW, CHILD_Restriction_FLAG, Parent_Chat_Restriction, Control_info)

TABLE 1

Sample User-Pass-String

| Data Element | Example | Comment |
| --- | --- | --- |
| EUAS-Anon-Log-in_ID | dkfkj 134fdr | Login-ID created dynamically by EUAS which is used to access website. Website verifies Log-in ID through use public key decryption scheme and pre-determined authentication protocol. |

TABLE 1-continued

Sample User-Pass-String

| Data Element | Example | Comment |
| --- | --- | --- |
| User_PW | Ikeepsecrets | User-PW created dynamically by EUAS which is used to access website. Website verifies Log-in PW through use public key decryption scheme and pre-determined authentication protocol. May include a biometric feature. |
| Child_Restriction | <18 years | User profile indicates Subscriber requesting log-in is a minor |
| Parent_Chat_Restriction | Yes | Parent has requested that child be prevented from using website chat feature |
| Control Information | 1 Minute timeout | Time-out user session if log-in not completed within 1 minute |

Subscriber server 210, such as a subscriber website, and log-in server 215, which may include EUAS logic, may establish a common record format for the UPS, as depicted in Table 1 above. In one embodiment, a website (content of subscriber server 210) may include links to various web pages, for example, links to three different types of users and correspondingly different entrance requirements for each. In this case, the website may modify the UPS record format, which is stored as part of their profile information. In one embodiment, to generalize the record format shown in Table 1, the first data element may include a link type element. For example, a link type record may be mapped to a known record type stored on the subscriber website, to allow the website to interpret the transmission of UPS records with different format lengths and data elements for different types of processing and end-users.

The log-in process described above to connect computer 205 with at least one of log-in server 215 and subscriber server 210 may, but need not, be anonymous. For example, during either anonymous or non-anonymous log-in, computer 205 may log-in to a subscriber server 210 website directly, or may be re-directed by the EUAS service of log-in server 215. In various embodiments, the identity of computer 205, or a user of computer 205, may be revealed to subscriber server 210 through, for example, information contained in the User Pass String. In one embodiment, log-in server 215 can provide a website with a UPS including a variety of user information (e.g., name, membership affiliation, or verification level) during the log-in process. The log-in server 215 can evaluate the UPS to establish a communication session between the log-in server 215 and the subscriber server 210 or between the computer 205 and the log-in server 215, for example.

In one embodiment, a user of computer 205 may register with a service provider that controls access to subscriber server 210 content. For example, a user of computer 205 may register with an "Identity Theft Prevention Service" (ITPS) service provider that provides log-in server 215. The ITPS service provider can be an entity associated with log-in server 215. Registration with the ITPS service provider can be the same as registration with the EUAS service provider. For example, the subscriber is authenticated, or not, and results can be logged. The UPS can be used, for example in conjunction with a dynamic password scheme to communicate between individual and organizational subscribers (or subscriber websites) and the ITPS service (e.g., log-in server 215).

The ITPS service generally includes logic to perform authentication, authorization, and accounting functions, and can establish at least one session between computer 205 and at least one of log-in server 215 and subscriber server 210, or between log-in server 215 and subscriber server 210. Subscribers or other entities may provide information that is received by the ITPS provider (e.g., by log-in server 215 or another computing device in communication with log-in server 215.) In one embodiment, this registrant identification data, which may include identity document data of at least one document creates a subscriber profile (or account) that can be stored in database 225, and may include, for example, names, contact information, addresses, government issued identification numbers (and associated data as indicated previously), spousal or dependent identifiable information, email addresses, phone numbers, biometric identification information, or other information to authorize subscriber authentication to requested third party services. For example, to authorize federal or state tax returns between computer 205 and subscriber server 210, information such as employer name, bank name, or other information pertinent to processing the filing via the network 220 to complete a tax return may be requested by log-in server 215. In addition, various personal facts (e.g., pet name, high school mascot) may be requested by log-in server 215 to create one or more User Pass Strings (UPS) for authentication purposes as discussed herein. In one embodiment, different UPS's are used with different third party services (i.e., for identity verification between a user of computer 205 and a subscriber entity associated with subscriber server 210). The registrant identification data may also include subscriber requested restrictions or policies for website entry and use. For example, these restrictions may communicate limitations to be enforced if log-in server 215 grants computer 205 access to content of subscriber server 210. It should be appreciated that in one embodiment log-in server 215 can deny computer 205 access to content of subscriber server 210.

ITPS subscribers, via respective subscriber servers 210, can receive prompts from log-in server 215 for a list of websites, services, or other information resources that log-in server 215 is authorized to provide identity verification to regarding the subscriber, as well as prompts for any subscriber set limitations on what data the ITPS service provider (e.g., log-in server 215 or the platform of system 200) can provide to third parties or other subscribers, or subscriber preferences for monitoring or reporting of activity such as authorizations given to third party subscribers. This information can be received by log-in server 215 with or as part of the registration data.

Figure 7:
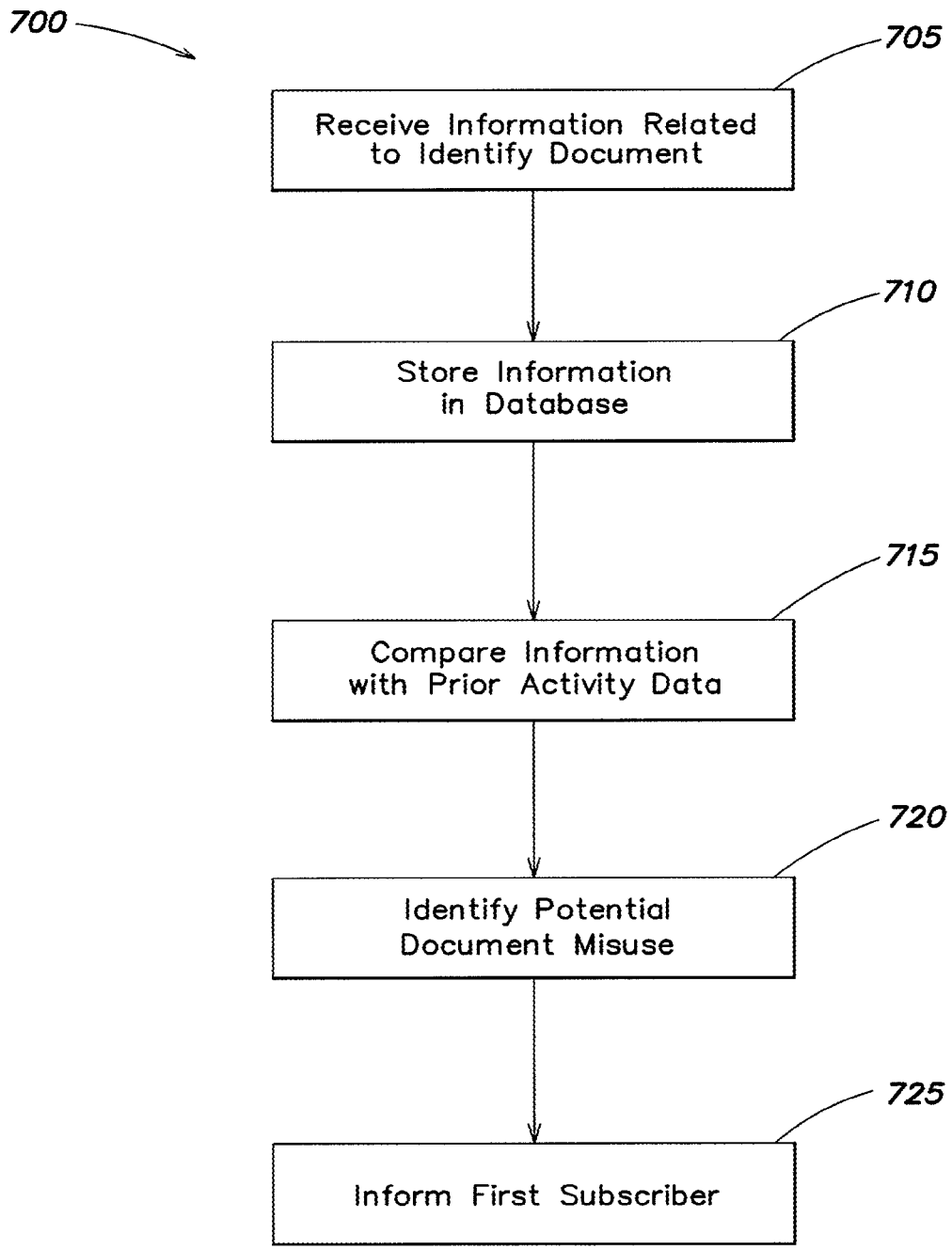
FIG. 7 is a flow chart depicting a computer implemented method for identifying improper use of an identity document in accordance with an embodiment.
Figure 8:
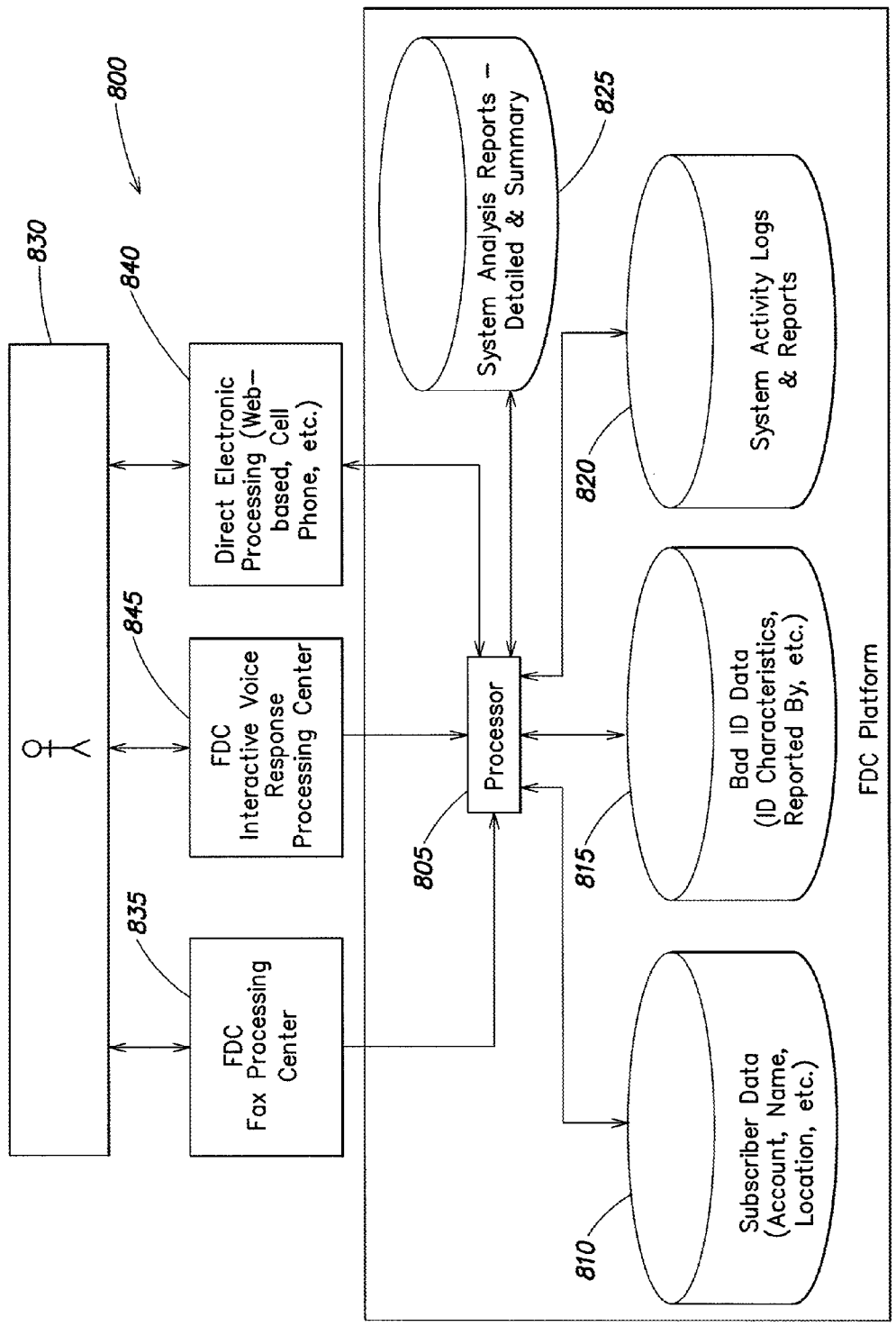
FIG. 8 is a block diagram of a computer networked fraud data collection system in accordance with an embodiment.

With reference to FIGS. 1 and 2, and looking briefly ahead to FIGS. 7 and 8 and generally to the other Figures the log-in server 215 can be part of an identity theft prevention service. In one embodiment, the log-in server 215 generates a user profile (e.g., account) of the subscriber associated with the subscriber server 210 (e.g., subscriber 830). The user profile can be based on the registrant identification data or the identity document data of a document associated with the subscriber. In some embodiments, the log-in server 215 can obtain data about the established session (ACT 140). The log-in server 215 can update the user profile based on the obtained session data. In some embodiments, the log-in server 215 provides, via the network 220, the session data to subscriber servers or other computing devices associated with a subscriber involved in the established session or to a different subscriber or third party.

In some embodiments, as part of an identify theft prevention service, the log-in server 215 accesses public data, such as from a public government database, via the network 220 and validates the user identification data based on the public data. For example, from received identify document data, the log-in server 215 can extract a name and address of a resident from a drivers license. The log-in server 215 can also access public data from database 225 or another database such as a public database having information about recorded deeds for home purchases. In this example, the log-in server 215 can identify a deed corresponding to the same address extracted from the drivers license and determine whether or not the name on the deed is the same or similar to (e.g., a common surname) the name on the drivers license. When, for example, the log-in server 215 determines that the names are the same or similar, the log-in server 215 can validate or authenticate the registrant identification data (or the associated subscriber) and establish a session between any combination of computer 205, log-in server 215, and subscriber server 210. Other examples of public data include postal service records, lists of deceased individuals, motor vehicle records, or public tax records. The log-in server as part of the ITPS service can compare registrant identification data with subscriber server identification data for inconsistencies or suspicious activity patterns.

In one embodiment, the log-in server 215 receives authorization to provide data indicating authentication of the subscriber to third parties. With reference to the above example, having verified a subscriber's identity the log-in server 215 can provide this verification information to a subscriber server 210 communicating with a different subscriber server 210 of the verified subscriber, or to a different subscriber server 210 or computer 205.

In some embodiments, the log-in server 215 generates an account or profile associated with a user or other subscriber, for example based on registrant data about the subscriber received by the log-in server 215. The account can have various rules of conduct regarding for example acceptable forms of identity document data, or a requirement that subscribers with accounts have no history of actual or suspected document misuse. In one embodiment, the log-in server 215 can detect a rule of protocol violation associated with a user profile, such as by identifying past activity data that indicates misuse of an identity document associated with the subscriber. In this example the log-in server 215 can cancel the user profile due to the protocol violation. In some embodiments, the log-in server 215 receives a request to suspend the user profile of a subscriber. For example, the log-in server 215 can detect evidence of document misuse from a past communication session involving that subscriber. In this example, the log-in server can deny or block establishment of future communication sessions with other subscribers of the identity theft prevention service.

For example, as part of the identity theft prevention service, the log-in server 215 establishes (e.g., enables or does not block) communication sessions with or between any number of subscriber servers 210 and computers 205. In one embodiment, during a communication session between at least the log-in server 215 and the subscriber server 210, or between at least the computer 205 and the log-in server, the log-in server 215 obtains a request for an identity status check. For example, the log-in server 215 can receive this request from the computer 205 for an identity check of a subscriber or other user of the identity theft prevention service. The log-in server 215 can provide data responsive to the request, such as an authentication of a subscriber, an indication that the subscriber has not been authenticated, or an indication the subscriber failed an authenticity evaluation and is of unverified identity or compromised status.

The ITPS service, via log-in server 215 and system 200 platform, can be initiated to verify the authenticity of a subscriber to the service. An authentication request can be initiated by an individual or one or more subscribers to the ITPS service. For example, parents using computer 205 can communicate via network 220 with log-in server 215 to authorize the ITPS service to analyze records pertaining to their child's identity, such as government issued identification (e.g., social security) cards, birth certificates, passports, or health records in government and third party data sources, and to instruct the ITPS service generate reports used for ongoing monitoring of potential identity theft. In some embodiments, via communication with log-in server 215, a subscriber can launch the ITPS service asynchronously in a batch mode to authorize or generate reports to monitor multiple different subscribers to the ITPS service. The results of the analyzed records (which can be indicated in the reports) can also be logged in the database 225 to capture details, such as time data, date data, IP address information, names of users, subscriber applied identity credentials, or purposes of authorization for identity authentications performed by the ITPS service, whether the authentication is successful or not. The logged data (e.g., inputs to the FDC service) can be used to analyze use of identity documents on an on-going basis.

ITPS Service Example Using System 200:

Consider the case when a subscriber, via subscriber server 210 communicates via network 220 with log-in server 215 to use the ITPS service, for example to file their IRS returns (either directly through the IRS website or through a third-party, such as their accountant, or another e-filing website). Several possibilities arise, as shown in Table 1A below. One scenario is that the individual and/or organizational subscriber(s) participating in ITPS' mutual authentication provided accurate, bona fide identity information (see case #1). Another scenario is that one or both the individual and organizational subscribers provided inaccurate information and may be masquerading for the purpose of identity theft (see case #2, 3, 4).

TABLE 1A

Types of Honest/Dishonest Authentication Scenarios

| Possible Types of Subscribers Using ITPS Service | Valid Individual Subscriber | Dishonest Individual Subscriber |
|---|---|---|
| Valid Organizational Subscriber | (Case 1) | (Case 2) |
| Dishonest Organizational Subscriber | (Case 3) | (Case 4) |

Components of the ITPS system 200 such as log-in server 215 can determine which case applies for each subscriber authentication. Although the goal of the Identity Theft Prevention System is to catch fraudulent subscribers at the time a subscriber authorization is requested, this may not be possible. Some fraudulent activity can best be detected by the system 200 if a second subscriber requests identity authorization using the same credentials (for an IRS e-filing, etc.), or if additional information comes to light that bears on the credibility of the subscriber identity. For example, criminals often use identities of the elderly, the very young, and the deceased to make claims (i.e., for Medicare or Medicaid services, IRS refunds, etc.). Since these populations are unlikely to make claims that would bring the fraud to light, the identity theft may go undetected without extreme surveillance measures.

Case 1: This represents a presumed successful authentication of all parties by ITPS system 200, as indicated for example in a communication from log-in server 215 to subscriber server 210 or computer 205. In this example case, an individual subscriber communicates with log-in server 215 to request identity verification and service authorization with a third-party (e.g., the IRS e-filing service, insurance carrier, etc.). ITPS system 200 verifies that an organizational subscriber exists which matches the individual subscriber request, and that the organizational subscriber accepts the individual's authorization request. Both individual and organizational subscribers respond to subsequent ITPS system 200 communications and confirm their acknowledgement/acceptance of the authorization outcome. No further subscriber communication or third-party or system-generated data is received to indicate a problem with the authorization outcome in this example. After multiple successful authorizations are performed for the subscriber, the service may assign them a lower risk score. The risk score may be used in various decision algorithms by log-in server 215 to decide if the subscriber fits a Case 1, e.g., low risk profile.

Case 2: In this case, ITPS system 200 verifies that an organizational subscriber exists which matches the individual subscriber request. However, the individual subscriber in this example is not honest about their identity. ITPS system 200 components (e.g., log-in server 215) can identify this if the organizational subscriber reports known problems with the subscriber identity or activities. ITPS system 200 may also use white or black lists of known good or bad subscribers that are matched by log-in server 215 during subscriber registration and authentication. The white or black lists may be generated by log-in server 215 by matching a variety of information sources, as described herein. If a possible case 2 scenario is identified, log-in server 215 can generate an alert for the individual and organizational subscriber, and the authorization will not, in this example, be approved. Being on a black list may or may not make a subscriber ineligible for all ITPS authorization services, depending for example on the nature of the authorization the subscriber is requesting and on the subscriber's ability to provide credible evidence and explanation to indicate the black list is in error. If a potential subscriber appears on a black list, log-in server 215 can generate and transmit an alert to appropriate assigned personnel (e.g., within subscriber organization(s), law enforcement, or the ITPS service, for example) who would determine appropriate next steps. In one embodiment this results in an increased subscriber's risk score (e.g., a high risk score). This in turn might result in denial, by log-in server 215, of authorization for certain subscriber websites.

Some subscriber verifications may appear on a grey list as determined by ITPS system 200 and subscriber policies (specified during registration establishing the protocol for authorizing subscribers). This, in turn, might result in system alerts and requests for more information from the subscriber and other third-party sources. It might also increase the subscriber's assigned risk score. If log-in server 215 as part of ITPS system 200 cannot clearly identify a Case 2 scenario, the subscriber validation may proceed as described for Case 1 until subsequent information comes to light to indicate the classification error. The ITPS system 200 service including database 225 can maintains logs and use decision algorithms (e.g., clustering algorithms, neural networks, self-organizing maps, statistical techniques, fuzzy rule-based classification techniques, etc.) that are continually refined as errors are revealed so the system 200 will improve its detection and classification capabilities over time.

Case 3: In this case, ITPS system 200 verifies that an individual subscriber exists. However, the organizational subscriber is not honest about their identity in this example, (see Table 1A above). ITPS system 200 can mitigate this problem by due diligence during registration and subsequent audit and review activities. ITPS system 200 may also use white or black lists of known good or bad organizational subscribers that are matched during subscriber registration and authentication, as described for case 2. Being on a black list can make an organizational subscriber ineligible for ITPS participation unless the subscriber provides credible evidence and explanation to indicate the black list is in error. Due to the potential harm to individual subscribers, organizational subscribers can be subject to additional scrutiny and higher standards of acceptance to qualify to participate in the ITPS service via log-in server 215. In one embodiment, use of ITPS system 200 is restricted to government agencies and other highly vetted organizations.

Case 4: This example represents the situation where all parties have misrepresented their identity. In this example, the ITPS system 200 can identify these situations during registration, as described in case 2 and 3 above.

The ITPS system 200 can mitigate various types of identity theft. For example criminals exploit vulnerabilities in the IRS electronic tax filing system to file fraudulent tax returns using another person's name or tax ID number to file an electronic claim with other details on the tax form (e.g., address, employer data, income, deductions, etc.) being fabricated. The ITPS service, which can be implemented together with at least methods 100 and 700 and systems 200 and 800 described herein, can mediate between the IRS server (e.g., an organizational subscriber server 210) and the tax filer (e.g., at computer 205) to authenticate the validity of one or both of these users by, for example, obtaining registration information, and server identification data and evaluating this data to provide access between these two computing device when identities are authorized. The ITPS system can also use additional data sources (e.g., public records) to determine with a low, medium, or high degree of confidence that users of computer 205 and subscribers associated with subscriber server 210 are who they say they are. Other examples of reasons why organizational subscribers associated with subscriber server 210 can use ITPS to validate user identities include verification of immigration status, child custody, Medicare filings, or insurance submissions.

Figure 4:
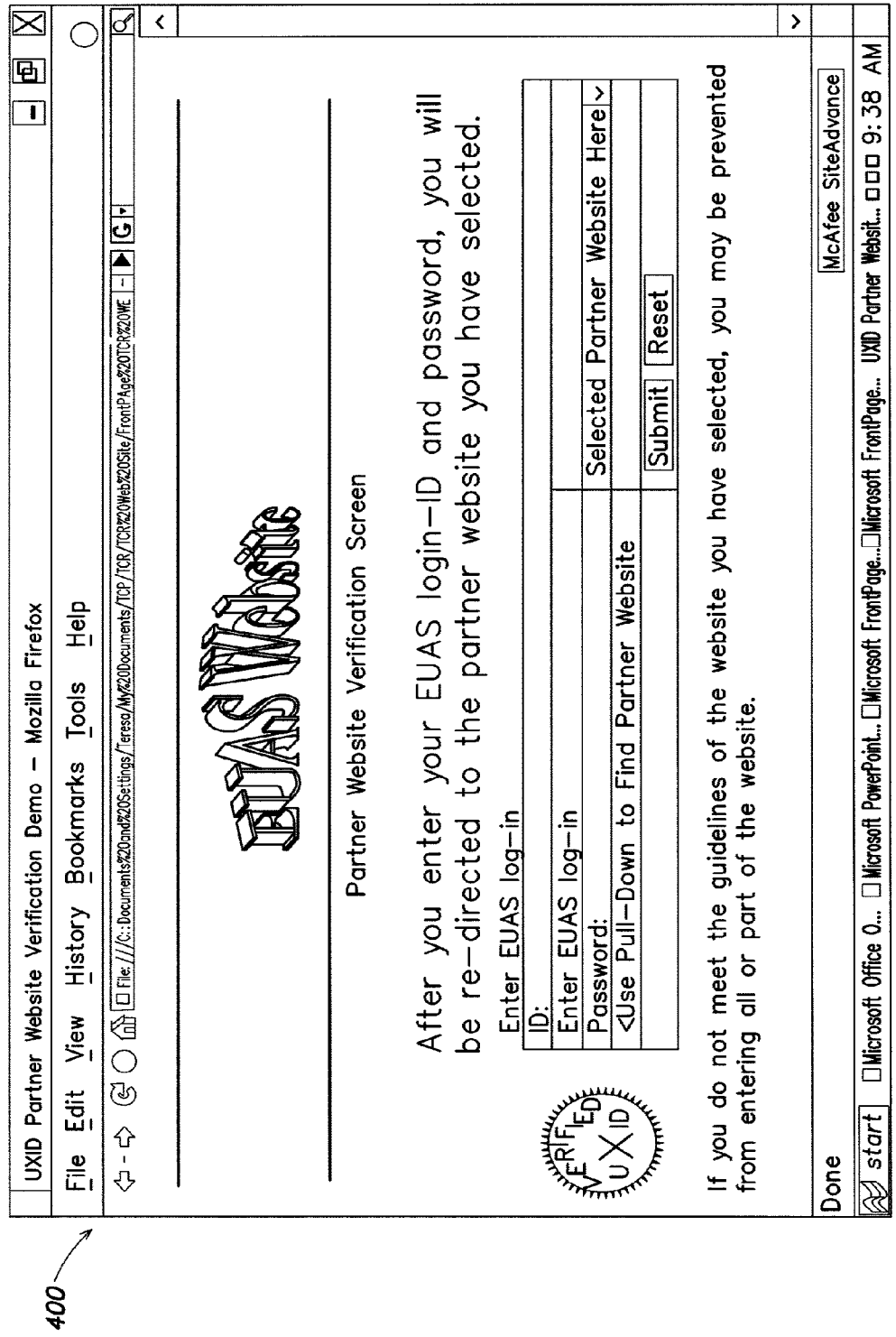
FIG. 4 is a screenshot depicting access control to a content provider in accordance with an embodiment.

FIG. 4 is a screenshot 400 depicting access control to a content provider in accordance with an embodiment. For example, the screenshot of FIG. 4 may be displayed in response to receipt of a query indicating that computer 205 wishes to access content of subscriber server 210. As depicted in one embodiment of FIG. 4, log-in server 215 can prompt computer 205 for a password or other information. In one example of this embodiment, failure to enter a correct password can result in denial of access to content of subscriber server 210, referred to in FIG. 4 as a partner website. In another example, of the embodiment of FIG. 4, entry of a password or other data may result either complete or partial user access to, for example, the partner website as depicted.

Figure 5:
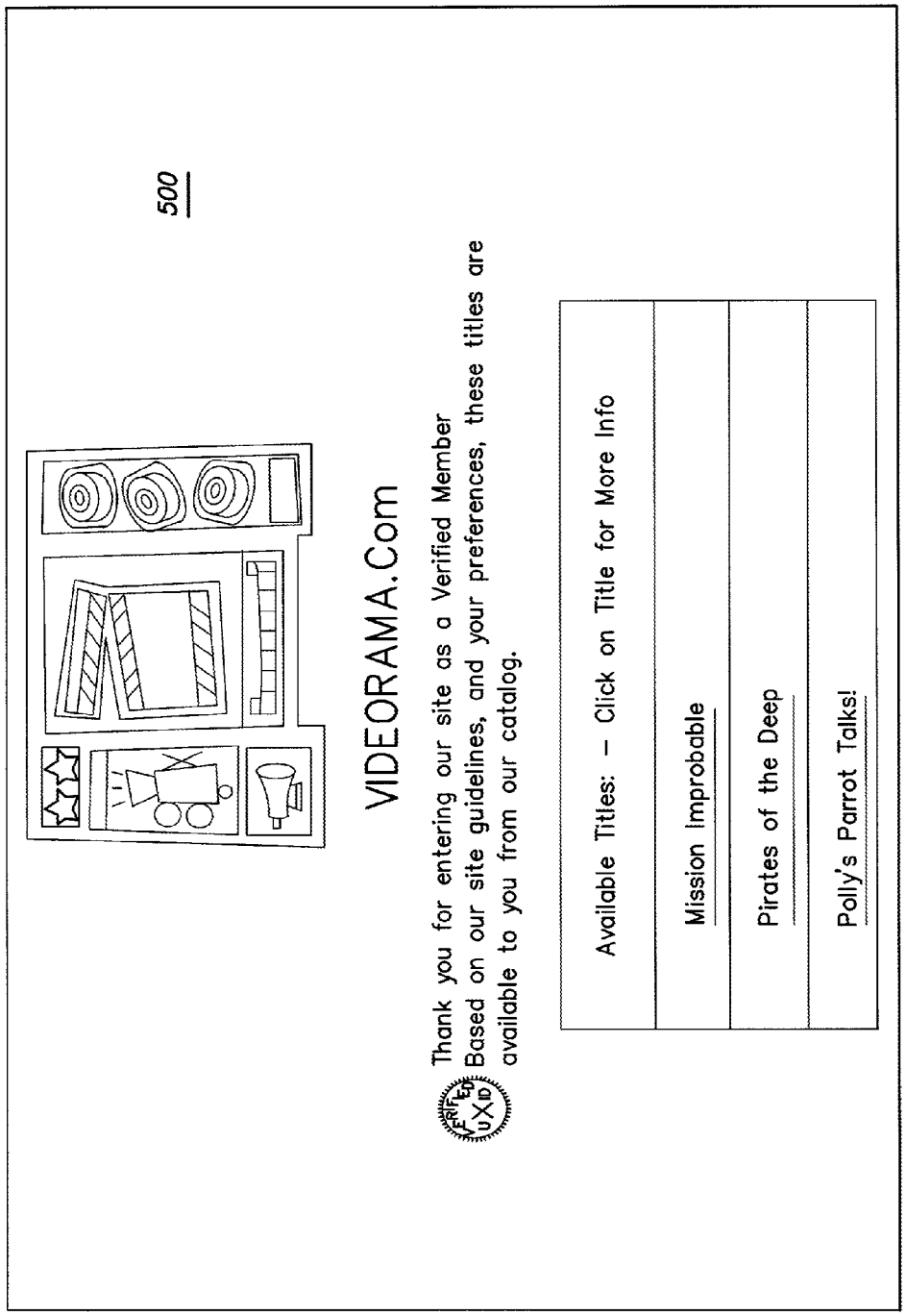
FIG. 5 is a screenshot depicting access control to a content provider in accordance with an embodiment.

FIG. 5 is a screenshot 500 depicting access control to a content provider in accordance with an embodiment. As illustrated in FIG. 5, partial access has been granted to content of subscriber server 210. As illustrated in FIG. 5, based on characteristics of computer 205, such as a password received at log-in server 215, computer 205 has been granted limited access to a webpage where, for example, a user of computer 205 may select from a customized list of available movie titles. It should be appreciated that, as illustrated in FIG. 5, different levels of access may be granted to content of subscriber server 210 based on the information received by log-in server 215. For example, as illustrated in FIG. 5, more, fewer, or different movie titles may be made available to computer 205 depending, for example, on the data received from computer 205.

Figure 6:
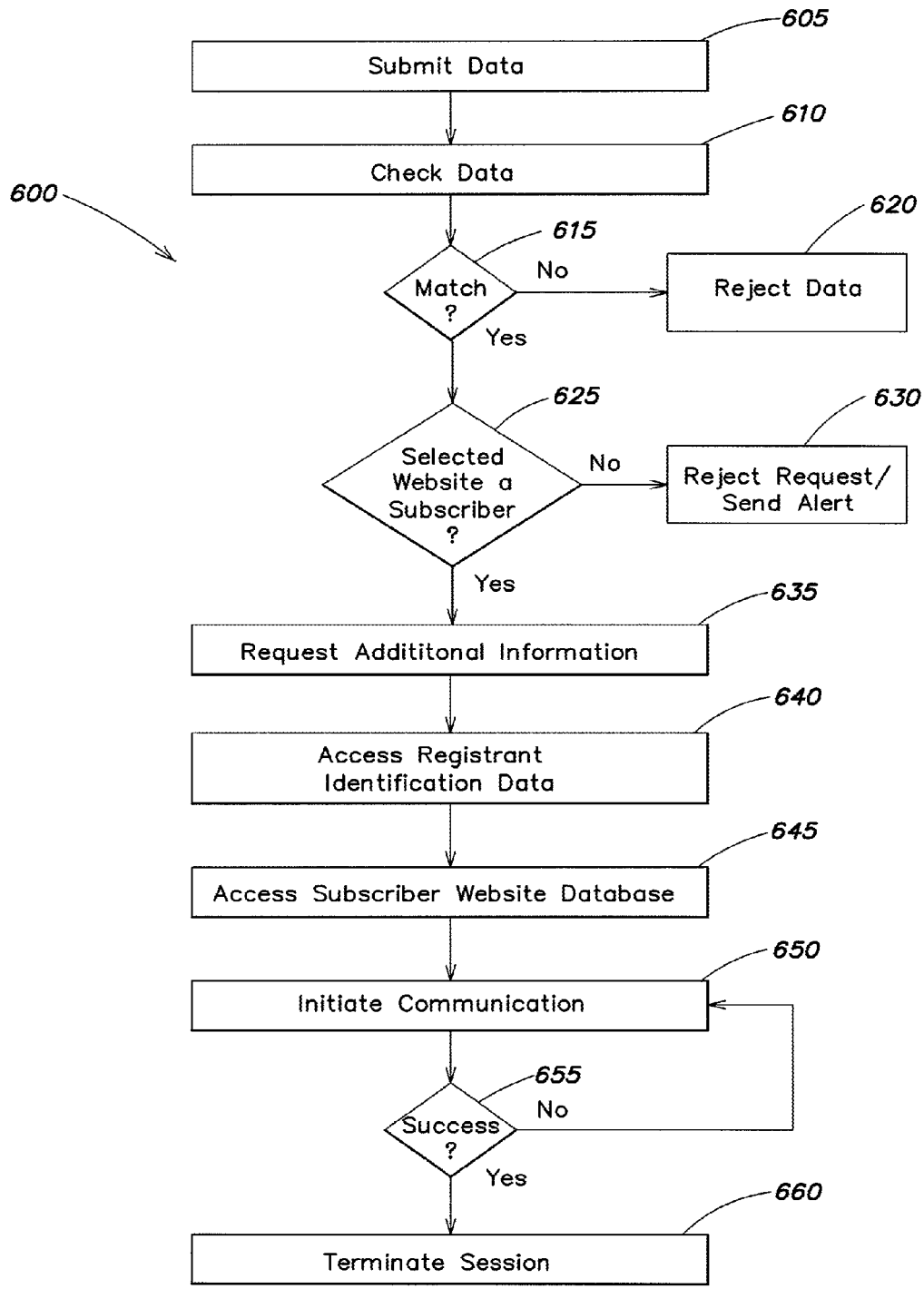
FIG. 6 is a flow chart depicting a computer implemented method for controlling access to content provider data in accordance with an embodiment.

FIG. 6 is a flow chart depicting a computer implemented method 600 for controlling access to content provider data in accordance with an embodiment. Method 600 may include the act of submitting data to an EUAS service (ACT 605). For example, this may include submitting EUAS identification, password, biometric data, or destination website (e.g., the content to which a user wished to access) to, for example, a log-in server, where this data may be received. Method 600 may include the act of checking the submitted data against a database (ACT 610) such as a subscriber end user database associated with the EUAS service. In one embodiment, method 600 may include matching the data with existing identification in the database (ACT 615). In one embodiment where no match is found, method 600 may include the act of rejecting the data (ACT 620). Rejecting the data may include denying access to at least part of a website. The method 600 for controlling access to content provider data can be part of an identity theft prevention service.

In one embodiment, where registrant identification data matches data in the database, method 600 may determine if the content a computer wishes to access is a EUAS subscriber (ACT 625. For example, this may include determining if a server where the desired content is located is a subscriber to a EUAS service. In one embodiment where, for example, a selected website is associated with a content provider that is a EUAS subscriber, method 600 may determine if computer 205 is associated with a person who has been reporting missing, and if so, may transmit a message to the appropriate authority that a profile corresponding to a missing person has been used.

In one embodiment, if method 600 determines that content such as a selected website does not correspond with any EUAS subscriber (ACT 625), method 600 may include the act of rejecting a request to access the website (ACT 630). This may ensure, for example, that a computer associated with EUAS may only access content that is also associated with EUAS. Should a log-in server require additional information, method 600 may include the act of requesting additional information from an end user to process the request to access content from, for example, a subscriber server (ACT 635).

Method 600 may also include the act of accessing registrant identification data (ACT 640). This may include accessing a database, or populating a UPS with restriction or preference information related to the type of access that may be granted to content included in a network. In one embodiment, method 600 may include the act of accessing a subscriber website database (ACT 645). This may include, for example, accessing a database associated with a subscriber server that provides content such as websites, and accessing a subscriber website database (ACT 645) and may include augmenting a UPS with restriction or preference information.

In an embodiment where a computer has at least partial access to content available through a network, method 600 may include the act of initiating communication between a computer and a website (ACT 650). For example, this may include initiating a session between a computer and a subscriber server, and sending a UPS according to a protocol, which may be predefined. Method 600 may include the act of determining if the initiated session was successful (ACT 655). If the session was not successful, method 600 may repeat the act of initiating the session (ACT 650) until a successful connection is established or until computer 205 terminates the attempts to initiate a session. Method 600 may also include the act of terminating a session between a computer and a subscriber server (ACT 660). For example, a user may shut down a computer, or may close a web browser, and as a result a log-in server may terminate the session between a computer and a web page associated with the subscriber server. In one embodiment, terminating the session (ACT 660) may include updating activity logs.

It should be appreciated that the computer implemented methods and access control systems provided herein may provides secure authentication and authorization of website visitors in both a anonymous or non-anonymous mode of operation. Entry into all or part of a website may be allowed or restricted based on, for example stated preferences of the website of subscriber server 210, the end-user of computer 205, or a parent or guardian of the end user. For example, parents may restrict a child's activities on subscriber server 210 websites. In one embodiment a server such as log-in server 215 offering the EUAS service need not require installation of client software on computer 205, and an end user therefore may not circumvent any restrictions by using a different computer because subscriber server 210 content access may still be controlled by log-in server 215, which can be remote from computer 205 or any other device attempting to access subscriber server 210 content. In one embodiment, notification may be provided to a predetermined location, such as computer 205, a telephone or an email account of a parent, if, for example, a missing child enters or attempts to access content of subscriber server 210.

In one embodiment, at least one of subscriber server 210 and log-in server 215 can maintain information to access content of subscriber server 210. This information may be used, for example, to customize the presentation to or service provided to log-in server 215. Login-IDs such as website-login-ID and passwords such as a, website-PW', may be managed in dynamic or static fashions, and forms of biometric identification may be used with the authentication and authorization process to, for example, facilitate computer 205 connection with subscriber server 210 where an end user is a child not prone to remember passwords.

One embodiment disclosed herein relates to a computer implemented method for identifying improper use of an identity document. FIG. 7 is a flow chart depicting a computer implemented method 700 for identifying improper use of an identity document in accordance with an embodiment. In one embodiment, computer implemented method 700 may include the act of receiving information related to an identity document (ACT 705). For example, receiving information (ACT 705) may include receiving, from a first subscriber, information related to an identity document. In various embodiments, an identity document may include, for example, birth certificates, passports, naturalization papers, state issued identity cards, corporate identity cards, building passes, military papers, identity cards from foreign countries, a People Access Security Service card (PASS card) issued by the United States government for travel between the Unites States, Canada and Mexico starting 2008, a Common Access Card (CAC) issued by United States Department of Defense for active duty military personnel, reserve personnel, civilian employees, and eligible contractor personnel, a military dependent or retiree ID card, student ID cards, a Transportation Worker Identification Credential issued by the Transportation Security Administration to identify individuals who have been cleared to have access to sensitive security areas related to transportation infrastructure including sections of airports and shipping terminals, and ships, Merchant Mariner's documents issued by the U.S. Coast Guard, Native American tribal documents, or electronic credentials such as email addresses.

In one embodiment, this information may be received (ACT 705) by a computer associated with a network. For example, the first subscriber, such as a merchant or law enforcement organization may have an account with a fraud prevention service. When the first subscriber receives an identity document, for example from a prospective customer or a suspected criminal, the first subscriber may transmit information related to the identity document to a computer. The information related to the identity document may include, for example, a driver license number, passport, number, social security number, name, address, a scanned image or digital photograph of the identity document, or other information related to data associated with the identity document.

In some embodiment, the method 700 is part of an identify theft prevention service. The identity theft prevention service generally includes a computer networked (e.g., Internet based or online) service whereby one or more servers or computing devices, including for example a server of a fraud data collection (FDC) platform authenticates subscriber identity credentials to authorize various third party services. For example, referring to FIGS. 1, 2, 7, and 8, the fraud data collection system 800 (including the server of the FDC platform) or the system 200 can authenticate the identities of individuals, businesses, insurance companies, healthcare organizations, or government agencies, for example. The authorized third party services can include, for example, insurance claims with insurance companies, or tax filings such as electronic computer network based income tax e-filings with the Internal Revenue Service or a similar agency of a sovereign government. The identity theft prevention service implemented by the method 700, the fraud data collection system 800 (including the server of the FDC platform) or the system 200 can provide controls, monitoring, and reporting capabilities to reduce, prevent, or identify identity theft for example by identifying instances of document misuse and alerting subscribers of the identity theft prevention service to the misuse.

Information related to the identity document or the authorization data can be received (ACT 705) at a server of the FDC platform via a computer network, from a subscriber server (or other computing device or devices) of a first subscriber. The information related to the identify document and the authorization data can be received (ACT 705) by the server of the FDC platform the same or different communication session or sessions between the server of the FDC platform and the subscriber server of the subscriber.

Computer implemented method 700 may also include the act of storing the information related to the identity document in a database (ACT 710). In one embodiment, after receiving information related to an identity document (ACT 705), computer implemented method 700 may include storing the information in a database (ACT 710). For example, a computer may receive (ACT 705) information related to an identity document from remotely located merchant via a computer network. A database or other memory may be associated with the computer receiving the information (ACT 705), and the computer may allow for storing of the information in an associated database (ACT 710). The authorization information can also be stored, for example by the server of the FDC platform in the database.

Computer implemented method 700 may also include the act of comparing, or performing a comparison of the information related to the identity document with prior activity data (ACT 715). For example, comparing the information with prior activity data (ACT 715) may include accessing, from a database, the information related to the use of an identity document, as well as data regarding prior activity of that document. In one embodiment, comparing information related to the identity document and prior activity data related to use of the identity document (ACT 715) can include determining if prior activity data exists regarding an identity document. For example, prior activity data may include data indicating that the identity document may have been previously misused. In one embodiment, comparing the information related to the identity document with prior activity data (ACT 715) can include identifying past uses of the identity document. Comparing the information with prior activity data (ACT 715) may include identifying prior activity data suspected to be fraudulent, such as suspected fraudulent prior use of the identity document. In various embodiments, prior activity data may be received from a plurality of different sources that, for example, have been previously presented with the identity document. In one embodiment, the server of the fraud data collection platform performs a comparison (ACT 715) of information related to the identity document, received from a first subscriber, with prior activity data related to use of the identify document, where the prior activity data is received from a second subscriber who, like the first subscriber, is registered with the identity theft prevention service. The prior activity data can be stored in a database of the FDC platform.

Computer implemented method 700 may include the act of identifying at least one instance of potential document misuse (ACT 720). In one embodiment, identifying potential document misuse (ACT 720) may include evaluating prior activity data stored in the database. The prior activity may include information indicating suspected or potential identity document misuse. Computer implemented method 700 may include the act of informing a subscriber of data identifying potential identity document misuse (ACT 725). For example, this may include providing data identifying potential identify document misuse to a first subscriber from whom information related to the identity document was received (ACT 705). Informing a subscriber of potential document misuse (ACT 725) may include a real time notification to a merchant stating that an identity document currently under evaluation by a merchant is suspected of past improper use.

For example, a merchant, or other subscriber to the identity theft prevention service such as a person, business, government agency, or corporate entity, may be presented with an identity document required to authorize a transaction such as a sale. The merchant may examine the identity document and provide information related to the identity document to, for example, a fraud prevention service (e.g., the server of the FDC platform) associated with a computer accessible via a computer network. Continuing with this illustrative embodiment, computer implemented method 700 may receive information related to the identity document (ACT 705). This information may be received from, for example, a merchant who has subscribed to the fraud prevention service such as the identify theft prevention service. In one embodiment, a computer may receive this information (ACT 705) over a computer network.

Information received from a plurality of subscribers detailing a plurality of identity documents may be stored in at least one database (ACT 710). In one embodiment, information related to any of these identity documents can be compared (ACT 715) with data stored in the database to determine a risk level associated with an identity document, (e.g., low risk, moderate risk, or high risk) and an indicator of this risk level may be provided to a subscriber (ACT 725) from the server of the FDC platform via the computer network.

Computer implemented method 700 for identifying improper use of an identity document may be referred to as a Fraud Data Collection (FDC) service and can include the identify theft prevention service. The server of the fraud data collection platform of the FDC service may collect data on known or suspected fraudulent or misused identity documents or credentials. In one embodiment, data may be received (ACT 705) from and shared with, for example, qualified service subscribers such as merchants, private security, businesses, individuals, or law enforcement officials. This information may be compared (ACT 715) against prior activity data to determine if an identity document has been, for example, reported as counterfeit or misused. In one embodiment the FDC of computer implemented method 700 can generate, create, and provide information regarding trends in suspected fraudulent use of identity documents.

The FDC systems and methods described herein generally evaluate and generate data from a diverse set of qualified subscribers using a variety of input methods. For example, FDC can provide a third party service that utilizes a FDC User Identifier (or log-in ID) and a FDC Secret User String (or log-in PW) that may be assigned to or used by one or more subscribers to secure system access. In one embodiment, a subscriber may pay a fee for this service. In one embodiment, receiving data from a subscribers (ACT 705) can include analyzing or evaluating the data using a multiplicity of approaches, including graphics, artificial intelligence, and statistical and data mining techniques, for example. These FDC systems and methods may create one or more predictive model, graphical summary dashboard, or report that can be provided to at least one subscriber. In one embodiment, informing a subscriber (ACT 725) of data identifying potential identity document misuse may include data regarding specific categories or types of identity documents.

In one embodiment, the FDC systems and methods can receive data on known or suspected fraudulent or misused identity documents and credentials. This prior activity data may be collected, evaluated, and provided to service subscribers, such as a merchant, for example. In one embodiment, FDC may identify improper use of an identity document when the issuing authority of the identity document, such as a government who issues a passport does not control the use and presentation of that document to other entities. For example, when a social security card is issued to an individual by the government, the individual to whom the card is issued may use the card when obtaining employment, health benefits, educational services, or membership in a variety of organizations. The government entity issuing the social security card may not be able to control and monitor use of the social security card, as the person to whom the card is issued is generally free to show the card to whomever the card holder pleases. It should be appreciated that such a document, in control of the document owner, and not the issuing authority, may be forged, altered or misused and the issuing authority may not be able to detect this security breach.

In one embodiment it may be known that an identity document has been altered or misused, but this information may never be passed to any authority. For example, someone under the legal drinking age may present counterfeit identification in an attempt to buy alcohol. A merchant may recognize the identification as being altered or fraudulent, and may turn away the person without any record being made that captures relevant details of the suspected fraudulent identity document and the attempt to misuse it. For example no information was captured regarding, for example, the type, location, or frequency of the suspected attempted fraud.

In various embodiments FDC systems and methods such as computer implemented method 700 can provide information regarding fraudulent identity documentation use. In one embodiment, information on an identity document can be provided to a subscriber in real time to determine if the identity document is suspected of past misuse.

In one embodiment a plurality of subscribers may register with the FDC service. For example, a subscriber such as a merchant, private security guard such as a bouncer, or a government official may submit an application to register with the FDC service. In one embodiment, potential subscribers may include registrars acting on behalf of the service who collect identity documentation, such as a passport or birth certificate from students enrolling in school, commercial businesses, government users, or other entities seeking information to determine if an identity document is suspect. A subscriber may use the FDC service to report instances of suspicious identity document use, and these instances may be received (ACT 705) by the FDC service. In one embodiment, a subscriber can request information through a computer network from, for example, an FDC server to determine if the identity document has been previously associated with suspicious activity.

An FDC service may include a variety of user-interfaces to receive information related to identity documents (ACT 705) and to inform subscribers of previous suspicious activity data related to identity documents (ACT 725). These interfaces may include, for example, facsimile transmissions, interactive voice response units via telephone, web-based graphical user interfaces, or cell phone interfaces, for example. These interfaces may also be used to communicate with the log-in server to request identity verification as part of an identity theft prevention service. In various embodiments, an FDC subscriber can request or receive data regarding, for example, any identity document or summary reports on a category of identity documents. An FDC service such as that of computer implemented method 700 may include analytical or other data processing techniques to determine trends, suspicious activity, or to predict future instances or locations where fraudulent documentation may be presented to a subscriber.

In one embodiment, a subscriber can apply for an account with the FDC service during at least one communication session via the computer network between a subscriber server associated with the subscriber and the server of the FDC platform. The subscriber may be asked, to supply information regarding the types of identity documentation on which the subscriber may provide information or receive reports. For example, a subscriber may be a liquor store merchant, and as a result driver licenses, state identity cards, or passports are some forms of identity documents that the subscriber may use to verify that customers are of legal age to make purchases.

The identify document can also include an electronic identity document used online, e.g., a credit card number or social security number entered into an online document such as a web page, rather than a physical document. This communication can occur via the computer network. For example, the server of the FDC platform can provide a request for information that is displayed on an interface (e.g., monitor) of a computing device associated with the subscriber server during a computer network based communication session. The display, in one embodiment, can include a web page having an interface to receive information from subscribers via the respective subscriber device. In one embodiment, a subscriber may include an employer, and the identity documents presented by a prospective employee may include birth certificates, driver licenses, or passports. A subscriber may be a merchant selling rated entertainment (such as a movie theater), and the relevant identity documents may include driver licenses or state identity cards.

In one embodiment additional subscriber information may be received. For example, this additional information may include a subscriber's name, location, or date of subscription with FDC service, for example. In one embodiment, computer implemented method 700 may prompt a subscriber to select how the subscriber will report information related to the identity document, such as suspected instances fraudulent presentation of an identity document.

The act of receiving information from a subscriber (ACT 705) may include receiving information at a computer or server located on a computer network. For example information may be received (ACT 705) via a web-based graphical user interface from a computer connected to the Internet. In one embodiment, receiving information from a subscriber (ACT 705) can include the use of Interactive Voice Response Units (IVRUs) to capture data from a subscriber using a telephone to call a specially-equipped FDC processing center. In one embodiment a facsimile device may be used to transmit information such as incident reports that can be received (ACT 705) and processed by, for example, FDC-authorized data entry personnel at designated FDC facilities. In one embodiment call centers may receive (ACT 705) information related to an identity document from a subscriber to, for example, make or request reports on identity credentials.

In one embodiment, upon successful registration, a subscriber may establish an account with the FDC service. The FDC service may provide confirmation of the subscriber's account and may specify a protocol for communicating information to the service when the service receives information related to an identity document, In one embodiment, the communication protocol options may include, for example, phone, facsimile, mail, email, or automated online reporting provided by the FDC service. In one embodiment, at least one subscriber can be issued a log-in ID or a log-in PW to enable access the FDC service.

A subscriber may report occurrences of suspected identity document misuse. For example, if a driver license or other identity document is presented to a subscriber and the subscriber suspects that the identity document is false or misleading, the subscriber may report this to the FDC service along with information related to the identity document in question, such as the name or address displayed on the identity document. The subscriber can be the owner or subject of the identity document or a different entity such as a business or school system that is also a subscriber to the identity theft prevention service. In one embodiment, the FDC service, for example as embodied in computer implemented method 700, may receive (ACT 705) information related to the identity document. For example, this information may be manually provided by a subscriber and entered into a computer associated with an FDC server. A subscriber may also complete a designated form which they may be faxed or mailed to the FDC service for entry into a computer or associated database. In one embodiment, a subscriber may call and speak to an FDC customer representative to report suspected or actual identity document abuse, and an FDC representative may enter this data into a computer, where it is received.

In one embodiment, a subscriber may submit information related to the identity document by placing a phone call to a FDC processing center equipped with voice recognition technology to receive the information (ACT 705) and to store the information in a database (ACT 710). In one embodiment a software application can be provided by the FDC service to receive information related to the identity document (ACT 705) and to store the information in a database (ACT 710). For example a software application may be associated with card scanning devices used by a subscriber to verify identity documents such as driver licenses. The subscriber may then use a scanning device to capture information related to the identity document and to transmit it to a central FDC platform where it is received by the FDC service (ACT 705). In various embodiments, an FDC platform may receive information related to an identity document (ACT 705) via, for example, wireless Internet transmission associated with the card scanning device, or a USB or similar network connection to a personal computer connected via a network such as the Internet to the FDC platform where the information may be received (ACT 705) and stored in at least one database (ACT 710).

In various embodiments, a subscriber may be presented with an identity document under suspicious circumstances, or a vigilant subscriber may have a heightened awareness for potential fraudulent identity document presentation. In some cases, visual inspection of an identity document by a subscriber may arouse suspicion of inappropriate identity document use. This may occur, for example, when a birth certificate is presented without a raised seal or which has an altered visual appearance. In one embodiment, a card scanning device, which may be used in liquor stores, bars, and other establishments when providing age-restricted goods and services, may indicate that an identity document may have been altered or may be fraudulent. In one embodiment including an electronic identity document credential, such as an email address, a subscriber such as a website operator or Internet Service Provider may determine that the email address has been compromised or misused. An FDC service, such as the FDC service of computer implemented method 700 may receive (ACT 705) from subscribers a report indicating suspected fraudulent presentation of an identity document.

In one embodiment, the FDC service may receive from a subscriber a reporting indicating suspected identity document misuse and a request to determine if others have reported misuse of the same identity document, or other similar identity documents. For example, computer implemented method 700 may receive information that a driver license appears to have been altered (ACT 705). In one embodiment of this example, computer implemented method 700 may also receive a request to see if others have reported suspected misuse of the same identity document. Computer implemented method 700 may then compare the received information with data stored in a data base (ACT 715) in response to this subscriber request. In response, computer implemented method 700 may provide to a subscriber an indication that suspicious reports about the same identity document have been received from, for example, three other subscribers in the same general geographic area. This may lead the subscriber to refuse to accept the identity document. In one embodiment, computer implemented method 700 may provide data to at least one subscriber informing them, for example, that no other reports have been received about a particular identity document, but that other similar types of identity documents, (e.g., driver licenses from the same state have been reported as being altered in some fashion. This report might cause a subscriber to view a particular identity document with caution and to act accordingly because it might be likely that it has been altered or stolen. For example, many driver licenses from a particular state have been reported as having their date of birth altered in a particular fashion, or many documents from many different states have been reported as displaying a fake street address (e.g., 1060 West Addison Street, Chicago, Ill., which is also known as "Wrigley Field").

In one embodiment, the FDC service may receive data (ACT 705) similar to, for example, the identity document information shown in Table 2 below. In one embodiment, computer implemented method 700 receives information about the reporting subscriber in addition to information about an identity document under analysis by the subscriber. Computer implemented method 700 may create trend analysis reports on a subscriber to determine subscriber patterns of reporting information related to identity documents. In one embodiment, computer implemented method 700 may evaluate data and information to determine a geographic location where the presentation of potentially fraudulent identity documents may be concentrated, or if a particular category of subscriber, such as bank tellers for example, are for example, particularly vulnerable to a particular type of potentially fraudulent identity document. In one embodiment, the FDC service may analyze data for patterns indicating that unscrupulous or misguided subscribers may be providing inaccurate information to protect innocent users of identity documents from being wrongly accused of fraudulent use of legitimate identity documents.

700 may identify potential identity document misuse (ACT 720) and inform a subscriber of potential identity document misuse (ACT 725).

For example, informing a subscriber of potential identity document misuse (ACT 725) may include generating and transmitting a report to a subscriber via a computer network. In one embodiment this may be in response to information received (ACT 705) by computer implemented method 700. In various embodiments, the FDC service may provide data to a subscribers in detailed (for one specific identity credential) or summary (for groups or categories of identity credentials) form. These reports may either be anonymous (e.g., no identifying data from the reported credential and/or reporting subscribers is provided) or non-anonymous format (e.g., where identifying data from the reported credential and/or reporting subscribers is provided). For example, the Department of Homeland Security may require more detailed data than a movie theater, or a researcher wanting general statistics on the prevalence of misused identity documents. In various embodiments, the FDC service can aggregate or anonymize subscriber and identity document data or information.

In one embodiment, a subscriber may want corroboration from the FDC service to confirm or alleviate concerns about a questionable identity document. For example, some identity documentation may be identified as stolen because it is being used within a short period at multiple locations in a manner consistent with and suggestive of misuse. In one embodiment, informing the subscriber of data identifying potential identity document misuse (ACT 725) may include informing a subscriber of a number of times an identity document has been reported used within a known time period.

In one embodiment, a subscriber may be suspicious of a presented identity document and have no way to directly verify its authenticity. In one example of this embodiment, a subscriber may use the FDC service to see if another subscriber has reported the same identity document. For example, a minor may use a fake driver license to buy ciga-

TABLE 2

Examples of Data Collected by FDC Service When Instance of Fraudulent Identity Document is Reported

| Data Element | Description |
| --- | --- |
| Subscriber Information | Subscriber Name, Location |
| Name (First, Last) | Full Name of Subscriber Employee Making the Report to FDC Service |
| Title | Title of Subscriber's Employee Making the Report to FDC Service |
| Type of Identity Document | Type of Fraudulent Documentation (e.g., Passport, Driver License, Birth Certificate, etc.) |
| Information on Contents of Reported Identity Document | (Name, Age, Issuing State, Date, etc.)-This information is collected from the identity documentation suspected of being or having been determined to be a fake or misused |
| Format and Appearance of Reported Identity Document | This information relates to the form and appearance of the identity documentation which is being reported to the service (Paper document, plastic ID card, smart card, electronic credential, etc.) |
| Time of Presentation | Time reported Identity Document Presented to Subscriber Reporting Incident |
| Date of Presentation | Date Identity Document Presented to Subscriber Reporting Incident |
| Method of Inspection | Method by which Identity document was determined to be questionable/fake (i.e., card scanner rejected driver license; document examiner rejects document for appearance problems; document is on the wrong material; etc.) |
| Identity Document-Rejection Classification | Rejection Classification (Document Definitely Determined to be a Fraudulent Document; Document Suspected of Being Fake Due to Appearance of Document; Document Suspected of Being Fake Due to Type of Use, etc.) |
| Information Request | Subscriber request for information (i.e. reports) on Document Use from FDC Service. |

In one embodiment, the FDC service can create reports identifying potentially fraudulent or suspicious use of identity documents. For example, computer implemented method rettes, where the fake driver license was produced from a fake driver license template. When, for example computer implemented method 700 receives information relating to the fake driver license template (ACT 705), the FDC service may update a database to store, for example, details of the template so that future fake driver licenses made from the same false template can be detected.

In one embodiment, the FDC service can monitor activities of a subscriber and perform trend analysis and other studies. These reports can help ensure that subscribers are accurately reporting their findings and are using the FDC service as intended.

In one embodiment, the FDC service, can perform custom analytical research studies commissioned by at least one subscriber. Such custom or on-request statistical or data manipulation and evaluation studies may be conducted. In one embodiment, studies may be conducted on received information related to identity documents (ACT 705) to, for example, create and provide information related to the frequency, type, location, and nature of identity documentation, as well as data regarding misuse or misappropriation of a particular identity document or class of identity documents.

In some embodiments, the server of the FDC platform informs (ACT 725) one or more subscribers to the FDC service, (which can include the identify theft prevention service), of data identifying potential document misuse. The data can indicate at least one instance of potential identity document misuse, such as unauthorized use of a stolen or counterfeit identity document. Subscribers can be informed of potential document misuse by the server of the FDC platform based in part on the authorization data received from the first subscriber. For example, the first subscriber to the identity theft prevention service can provide authorization data to authorize communication between the server of the FDC platform and additional identified subscribers, via their identified subscriber servers or other computing devices. In some embodiments, via the computer network the server of the FDC platform establishes at least one communication session with servers or other computing devices of subscribers to electronically communicate the data identifying one or more instances of potential identity document misuse. This communication can include text message, mobile phone, email, fax, or smartphone application communications.

FIG. 8 is a block diagram of a computer networked fraud data collection system 800 in accordance with an embodiment. System 800 (e.g., a fraud data collection platform) generally includes at least one processor 805. Processor 805 may be included as part of a computer or server having sufficient processing power and associated with sufficient memory to perform the operations described herein. For example, processors 805 can be part of one or more servers of an identify theft prevention service. In one embodiment, processor 805 is included in a computer that forms part of a network, such as the Internet. In one embodiment, processor 805 is associated with at least one database. For example, FDC system 800 may include at least one subscriber data database 810, bad ID data database 815, system activity and logs database 820, and system analysis and reports database 825. In one embodiment, each of subscriber database 810, bad ID database 815, activity logs database 820, and reports database 825 can be included in a single database.

In one embodiment, subscriber database 810 includes information about subscriber 830, such as an account number, name, or location, for example. Bad ID database 815 generally includes information regarding an identity document, such as characteristics of the identity document. For example, an identity document could appear altered in a certain manner, such as a possibly altered name, address, photograph, or date of birth. System activity logs and reports database 820 can include data regarding activity of subscriber 830, as well as activity such as reported uses of a particular identity document or class or identity documents, for example. Analysis reports database 825 may include data summarizing activity of, for example, subscriber 830, or particular identity documents, classes of identity documents, or types or potential fraud. In one embodiment, reports included in analysis reports database may be in an abbreviated summary form or a more detailed form.

FDC system 800 may include at least one subscriber 830. In one embodiment, subscriber 830 can provide to or receive from processor 805 any information stored in one or more of subscriber database 810, bad ID database 815, activity logs database 820, and reports database 825. Subscriber 830 may include, for example, a merchant, a government agent, a registrar, a parent, a health care provider, an educational institution, a registered organizational entity, a governmental or non-governmental organization, a financial institution, or private security personnel such as a security guard. In general, subscriber 830 can be in a position to receive and evaluate various forms of identification before granting the presenter of the identification with goods, services, or access to a location.

Subscriber 830 and processor 805 may communicate via a plurality of communication channels. For example, subscriber 830 may transmit and receive information related to an identity document via FDC facsimile processing center 835. Facsimile processing center 835 is generally configured to transmit and receive facsimile transmissions between subscriber 830 and processor 805. In one embodiment facsimile processing center 835 may include at least one computer adapted to send and receive facsimile transmissions. In one embodiment, facsimile processing center 835 receives an ITPS service identity verification fax request and provides the same to direct electronic processing unit 840 or to processor 805.

Subscriber 830 and processor 805 may also communicate via direct electronic processing unit 840. In one embodiment, direct electronic processing unit 840 includes at least one network connecting processor 805 and a computer used by subscriber 830 such as the Internet, a local or wide area network, telephone network, or cell phone network, for example. Subscriber 830 and processor 805 may also communicate via at least one FDC interactive voice response processing center 845. Voice processing center 845 generally includes a call center associated with processor 805. The call center can receive calls from subscriber 830 and provide information obtained during the calls to direct electronic processing unit 840 or to processor 805. Voice processing center 845 may also access at least one of databases 810, 815, 820, and 825 via processor 805 to provide information regarding an identity document to subscriber 830.

As appreciated given the benefit of this disclosure, references to subscriber 830 include references to a computing device such as one or more subscriber servers or other computing such as laptop or desktop computers, smartphones or tablet computers that can communicate with a server of the fraud data collection platform (e.g., processor 805) via a computer network such as the network 220.

It should be appreciated that the FDC service and the ITPS service allows subscribers to report fraudulent documents or see if information is available which might indicate that the document is false or is being misused. A subscriber may register with an FDC service provider and may report potentially fraudulent or misused identity documents or credentials. The FDC service provides a third-party service that may enable reporting and tracking of various types of identity documents that may be misused, including paper documents, electronic credentials, ID cards, and other types of identity documentation. In one embodiment, the FDC service includes an identity theft prevention service (ITPS).

In one embodiment, the FDC service collects statistics and produces reports on fraudulent or misused identity papers or documents or credentials for subscribers. For example, the FDC service can produce reports indicating the frequency, timing, or types of abuse reported by subscribers. The FDC service can provide evidence to subscribers to assist in a determination of the veracity of an identity document. The FDC service can provide analytical studies involving statistical and data mining techniques to reveal patterns of identity document abuse such that prescriptive actions can be taken to prevent or minimize the abuse. The FDC service allows many types of geographically dispersed subscribers in a variety of different fields to submit data and to obtain reports on identity documents from a third-party service.

With reference to FIGS. 1, 2, 7, and 8, as part of a system or method of identifying potentially improper identity document use, a server of the fraud data collection (FDC) platform (e.g., log-in server 215 or processor 805) of a fraud data collection or identity theft prevention service can receive information related to an identity document via a communication using a computer network (e.g., network 220. Subscribers 830 can join this service by providing authorization or registration data to the log-in server 215 or processor 805 to create an account. The identity theft prevention service can monitor identity document activity of a subscriber 830, identity potentially improper identity document use, and alert that subscriber 830 as well as additional subscribers 830 of misuse or potential misuse of at least one identity document that may suggest identity theft or other fraudulent or unauthorized identity document misuse.

For example, the FDC platform server can receive information (ACT 705) related to an identity document from a subscriber 830 (e.g., a first subscriber or a computing device of the first subscriber). This received information can relate to the use or presentation of the identity document by the first subscriber or by someone else, for example on behalf of the first subscriber. This received information can also include data about the identity document, such as names, address, issuing authorities, expirations, security information (e.g., watermarks) or other data. The subscriber 830 can be a member of or participant in the identify theft prevention service. For example, subscriber 830 may wish to protect his or her identity form theft, and can subscribe to the identity theft prevention service.

The FDC platform server 215, 805, can also receive (ACT 705), from the first subscriber, of authorization data. The authorization data can indicate that the first subscriber is registered with the identity theft prevention service. The authorization data can also identify other subscribers 830 (e.g., a second subscriber or a third subscriber) to the identity theft prevention service. In one embodiment, the authorization data authorizes the FDC platform server 215, 805 to communicate information about the first subscriber to other subscribers. For example, the authorization data can identify additional subscribers authorized to receive communications via the network 220 from the FDC platform server 215, 805. The authorization data can include registration data used by the FDC platform server 215, 805 to create an account for the subscriber 830, or the registration data can be provided by the subscriber 830 to the FDC platform server 215, 805 separately from the authorization data. The registration data can be used by the FDC platform server 215, 805 to generate an account for the first subscriber. For example, the registration data can include a name, address, or other information of a subscriber 830.

The FDC platform server 215, 805 can store the received information (e.g., authorization data or information related to an identity document) in at least one database associated with the identity theft prevention service (ACT 710). In some embodiments, the FDC platform server 215, 805 evaluates (e.g., performs a comparison of) information related to the identity document and prior activity data. The prior activity data can be received from a different one of subscribers 830, such as a second subscriber registered with the identity theft prevention service. Based on information related to the document and prior activity data, FDC platform server 215, 805 can identify potential misuse of the identity document.

The FDC platform server 215, 805 of the identity theft prevention service can alert one or more of subscribers 830 to the potential misuse of the identity document. For example, FDC platform server 215, 805 can establish communication sessions with subscriber servers 210 via the network 220 to communicate an alert for display at one of the subscriber servers 210 to one of subscribers 830. For example, the potential misuse can relate to the potential presentation of a stolen or altered identity document of a first subscriber. The FDC platform server 215, 805 can identify this instance of potential identity document misuse and inform additional subscribers of the potential misuse. In some embodiments, the FDC platform server 215, 805 has received, from the first subscriber via the network 220, authorization to contact additional subscribers to inform them of the potential misuse.

In some embodiments, where the subscriber 830 (e.g., a first subscriber) has an account with the identity theft prevention service, the FDC platform server 215, 805 can update the account to indicate that one or more subscribers 830 were informed by the FDC platform server 215, 805 of potentially improper use of an identity document associated with the first subscriber.

The FDC platform server 215, 805 can also deny or block a request to establish a communication session between subscribers of the identity theft prevention service. For example, subscribers 830 can include individuals, organizations, merchants, or businesses. In some embodiments, subscribers 830 can conduct transactions with each other via the FDC platform server 215, 805. In this example, a first subscriber attempting to access an information resource (e.g., website) of a second subscriber via the Internet or other computer network 220 can have the access request intercepted by a component of the fraud data collection platform (e.g., the FDC platform server 215, 805). Subsequent to interception, the FDC platform server 215, 805 may identify potential identity document misuse of an identity document associated with the first subscriber and as a result of this identification, deny the request to access a subscriber server of the second (or any other) subscriber.

In one embodiment, the FDC platform server 215, 805 that for example is part of an identity theft prevention system can generate reports or research studies based on data obtained by FDC platform server 215, 805. For example subscribers 830 to the identity theft prevention system can request a research study based on usage patterns of one or more identity documents. The request for a research study can be received by FDC platform server 215, 805 via a network 205 communication. The FDC platform server 215, 805 can communicate with any of databases 225, 801, 815, 820, and 825 to obtain information that is part of the fraud data collection platform such as the frequency, type, geographic location, or nature of an identity document (e.g., a drivers license, credit card, or passport) or a class of identity documents having a common geographic or temporal location (all drivers licenses in the state Connecticut, or all credit cards ending with the same four numbers, or belonging to the same credit card company, or issued within a common time period.

The FDC platform server 215, 805 can also access from any of these databases data indicating a misuse of the identity document or class of identity documents, and based on this data can generate a research study including this data or summarizing the findings. The research study can be provided by the FDC platform server 215, 805 to one or more of subscribers 830.

Figure 9:
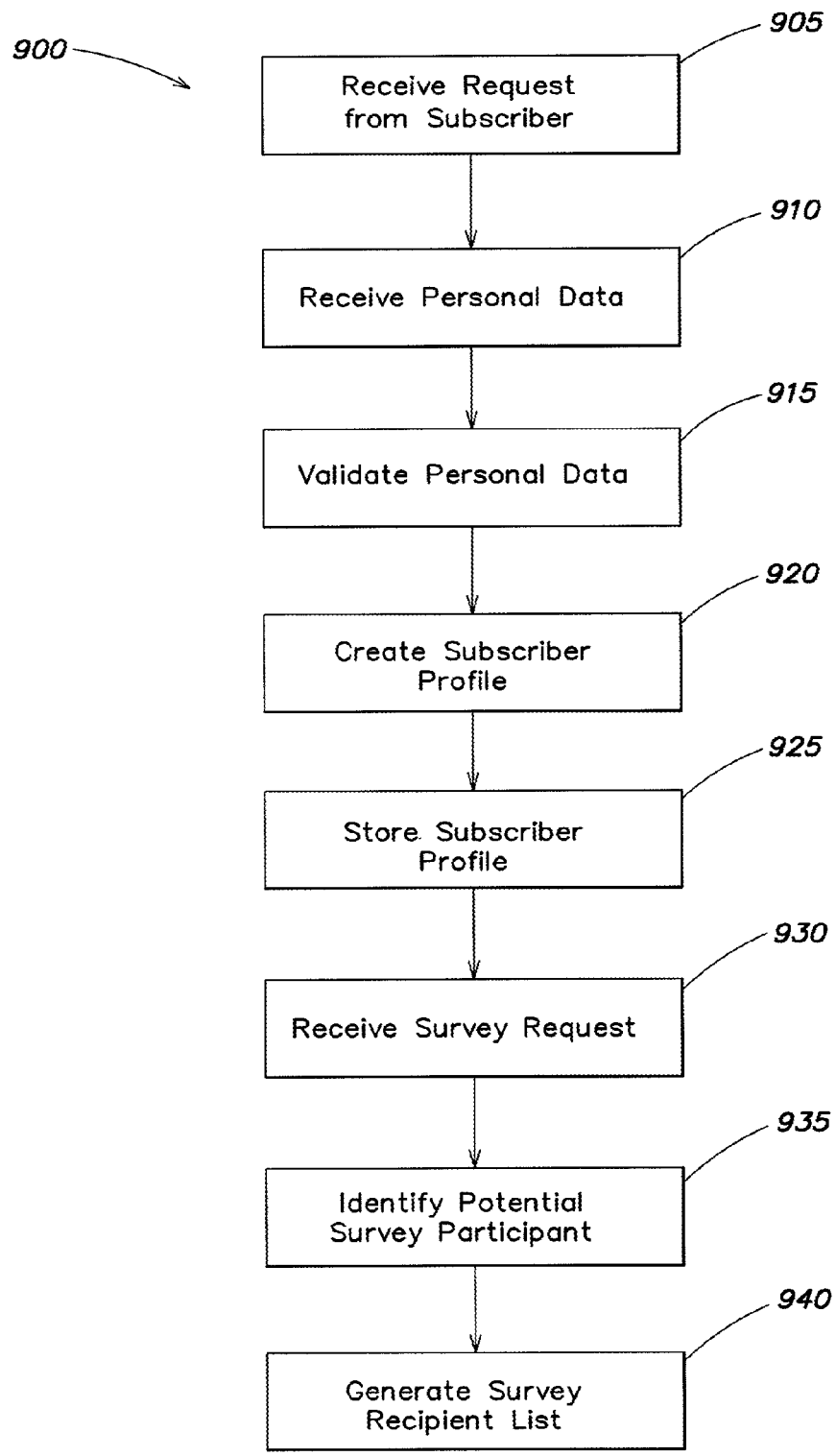
FIG. 9 is a flow chart depicting a computer implemented method for providing a plurality of survey participants in accordance with an embodiment.

One embodiment disclosed herein relates to a computer implemented method for providing a plurality of survey participants to a surveyor. FIG. 9 is a flow chart depicting a computer implemented method 700 for providing a plurality of survey participants in accordance with an embodiment.

FIG. 9 is a flow chart depicting a computer implemented method 900 for providing a plurality of survey participants in accordance with an embodiment. Computer implemented method 900 may include the act of receiving a request from a participant to be included in a survey pool (ACT 905). In one embodiment, receiving a request from a participant (ACT 905) may include receiving a request from a computer through a network such as the Internet. For example, receiving a request (ACT 905) may include receiving a request from a subscriber indicating that the subscriber avails himself or herself to a survey or to various classes of surveys. In one embodiment, a subscriber may be interested in, for example, automobiles. In this illustrative embodiment, receiving a request (ACT 905) may include receiving a request that a subscriber be included in a survey pool so that the subscriber may be contacted to participate in any surveys related to automobiles.

In one embodiment, computer implemented method 900 includes the act of receiving personal data associated with the participant (ACT 910). For example, receiving personal data associated with the participant (ACT 910) may include receiving the participant's name, user name, address, email address, password, or other identifying information. Receiving a participant's personal data (ACT 910) may also include receiving information about a participant's interests, likes, hobbies, or purchasing habits. This may include, for example, information stating that a participant enjoys photography and is interested in digital cameras. In one embodiment, receiving a participant's personal data (ACT 910) may include receiving information regarding a particular sport or sports team admired by the participant. In one embodiment, receiving participant's personal data (ACT 910) can include receiving data about a participant's political preference, such as a political party or particular politician favored by the participant.

In one embodiment, computer implemented method 900 includes the act of validating the personal data (ACT 915). For example, validating the personal data may include prompting the participant to re-enter personal data. In one embodiment, validating the personal (ACT 915) includes contacting the participant to verify that the personal data is valid. Validating the personal data (ACT 915) may also include receiving a log-in ID or log-in PW from the subscriber to authenticate the subscriber when the attempt to use the service.

In one embodiment, computer implemented method 900 includes the act of creating a participant profile (ACT 920). Creating a participant profile (ACT 920) may include generating an account for the subscriber. For example, creating a participant profile (ACT 920) can include aggregating data related to the subscriber into at least one file. In one embodiment, creating a participant profile may include generating an electronic compilation of subscriber information such as identifying information (e.g., name, address, password, income, contact information, age, gender, race, religion, nationality) and consumer related information (e.g., spending habits, likes, dislikes, preferences, recent purchases, potential purchases, political preference, hobbies). Creating a subscriber profile (ACT 920) generally includes compiling sufficient information to be responsive to a request from, for example, a survey commissioner, to run a survey customized to a targeted audience.

In one embodiment, computer implemented method 900 includes the act of storing the participant profile (ACT 925). For example, storing the participant profile (ACT 925) may include storing the profile in a database associated with a computer that received the request from the subscriber (ACT 905), received the personal data (ACT 910), validated the personal data (ACT 915), and created the subscriber profile (ACT 920). Storing the subscriber profile in a database (ACT 920) may include storing the profile in a database associated with a network such as the Internet, a telephone network, or a facsimile network, for example.

In one embodiment, computer implemented method 900 includes the act of receiving a survey request (ACT 930). For example, receiving a survey request (ACT 930) may include receiving a survey request from a survey commissioner. In one embodiment, the survey request includes survey criteria. In one embodiment, receiving a survey request (ACT 930) includes receiving the request at a computer associated with a database where the subscriber profile is stored. For example, a survey commissioner may wish to commission a survey. The survey commissioner may contact a service provided by computer implemented method 900. Receiving the survey request (ACT 930) may include receiving information as to What type of survey is to be conducted. For example, receiving the survey request may include receiving information regarding the subject matter of the survey. Continuing with this example, a survey commissioner may wish to run a survey regarding a consumer good such as washing machines. In this illustrative embodiment, receiving a survey request (ACT 930) can include receiving information requesting a list of potential survey participants having a subscriber profile that indicates an interest in washing machines. This may include, for example, subscriber profiles indicating that a subscriber has recently purchased a washing machine, or indicating that a subscriber may purchase a washing machine in the future. In one embodiment, the subscriber profile may not indicate that a subscriber has purchased or will purchase a washing machine, but may instead indicate that the subscriber has purchased or will purchase, for example, a house, and therefore may be interested in household appliances such as a washing machine.

In one embodiment, computer implemented method 900 includes the act of identifying the participant as a potential survey recipient (ACT 935). For example, identifying the participant as a potential survey recipient (ACT 935) may include identifying the participant based at least in part on a comparison of the participant profile and the survey criteria. Identifying potential survey recipients (ACT 935) may include evaluating a survey request and at least one subscriber profile to determine if the subscriber associated with the subscriber profile satisfies any conditions or requests in the survey request. For example, computer implemented method 900 may receive a survey request (ACT 930) indicating that a survey commissioner wishes to conduct a survey regarding, for example, sunglasses designed for women. In this example, identifying potential survey recipients (ACT 935)

may include identifying all women subscribers, identifying women subscribers of a certain age range, identifying any subscribers indicating an interest in sunglasses, identifying subscribers that live in a sunny location, or identifying subscribers having an interest in similar products, such as earrings or cosmetic products.

In one embodiment, computer implemented method 900 includes the act of generating a survey recipient list (ACT 940). For example, generating a survey recipient list (ACT 940) may include generating a survey list responsive to the survey request. In one embodiment, generating a survey recipient list (ACT 940) includes generating a survey list that includes the potential survey participant. Generating a survey recipient list (ACT 940) may include creating a list of at least one subscriber identified as a potential survey participant (ACT 935) based on a comparison of at least one subscriber profile and any survey criteria received (ACT 930) from a survey commissioner. In one embodiment, the survey recipient list may be provided to a survey commissioner, who may pay a fee to a service provider that provides computer implemented method 900.

Computer implemented method 900 generally relates to the commissioning, distributing, collecting, analyzing, generating, creating, or reporting results of anonymous survey and advertising events conducted with pre-qualified, systematically selected participants. Analogously, a system for providing a plurality of potential survey participants is also provided. Either computer implemented method 900 or its analogous system can access a plurality of subscribers who have agreed to participate in various anonymous survey or advertising programs. In one embodiment this participation may be in exchange for receiving various kinds of benefits or rewards. Subscribers, who join the service, as well as participants who partake in a survey may be pre-qualified in terms of their identity verification, profile information, and interest or willingness to participate in various types of advertising or survey events. This may result in higher response rates and faster program execution times, while promoting goodwill and lessening participant irritation by eliminating unsolicited attempts to contact them and collect information. This improves the accuracy of response data by ensuring participants respond only once to a program invitation and are appropriately pre-screened.

Figure 10:
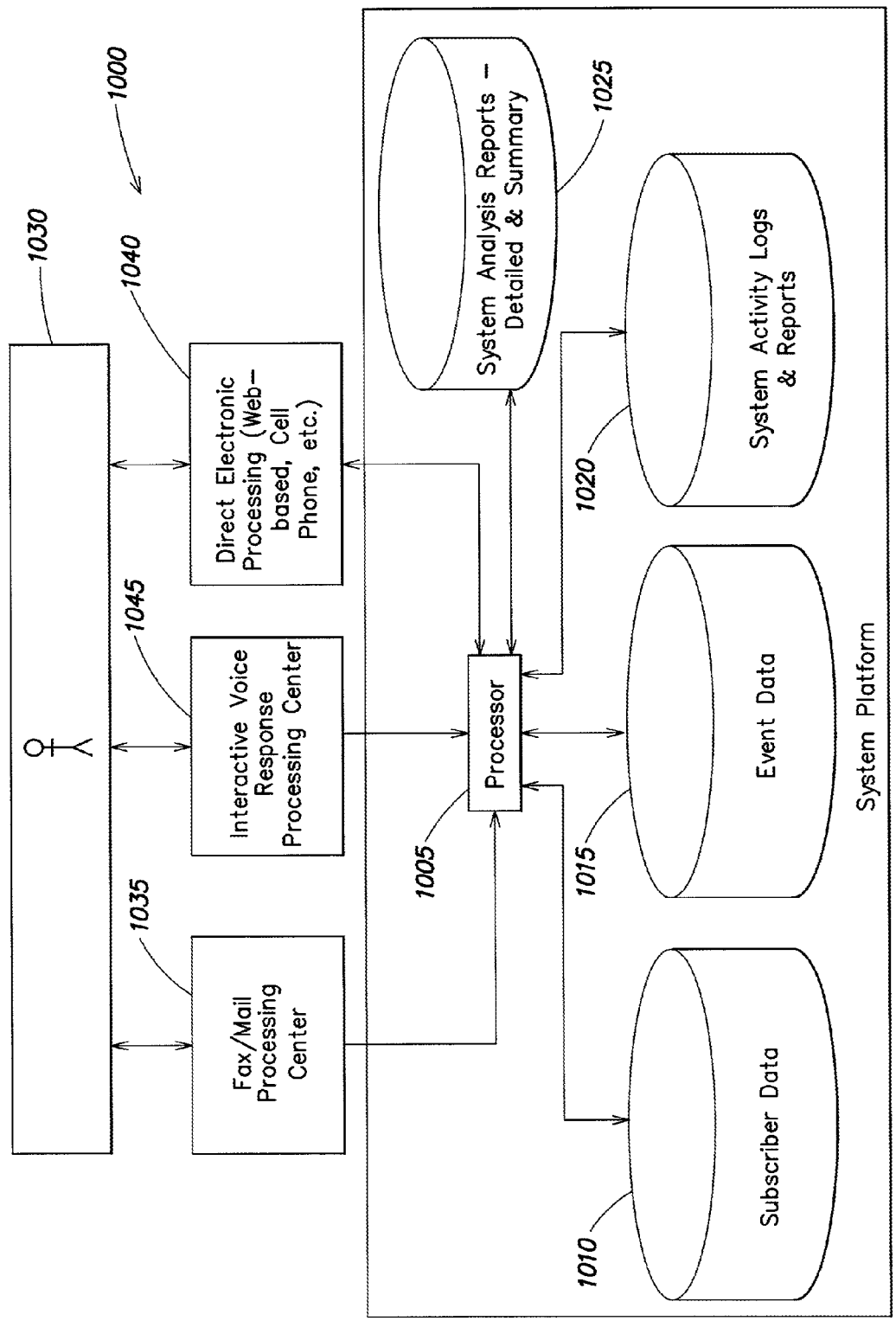
FIG. 10 is a block diagram of a computer networked survey participant identification system in accordance with an embodiment.

FIG. 10 is a block diagram of a computer networked survey participant identification system 1000 in accordance with an embodiment. System 1000 may include at least one processor 1005. Processor 1005 may be included as part of a computer or server having sufficient processing power and associated with sufficient memory to perform the operations described herein. In one embodiment, processor 1005 is included in a computer that forms part of a network, such as the Internet. In one embodiment, processor 1005 is associated with at least one database. For example, system 1000 may include at least one subscriber data database 1010, event data database 1015, system activity and logs database 1020, and system analysis and reports database 1025. In one embodiment, each of subscriber database 1010, event data database 1015, activity log database 1020, and reports database 1025 can be a single database.

In one embodiment, subscriber database 1010 includes information about subscriber 1030, such as an account number, name, or location, purchasing habits, or product interests, for example. Event data database 1015 may include information regarding a survey, such as characteristics of the survey or information to assist in the targeting of subscribers well suited to partake in the survey. System activity logs and reports database 1020 can include data regarding activity of subscriber 1030, and additional data such as survey participation rates or data associated with potential survey recipients, for example. Analysis reports database 1025 may include survey results or other data summarizing activity of, for example, subscriber 1030. In one embodiment, reports included in analysis reports database may be in an abbreviated summary form or a more detailed form.

Survey participation system 1000 may include at least one subscriber 1030. In one embodiment, subscriber 1030 can provide to or receive from processor 1005 any information stored in one or more of subscriber database 1010, event data database 1015, activity log database 1020, and report database 1025. Subscriber 1030 may include, for example, a merchant, a person, or a survey commissioner, Processor 1005 may include logic associated with a survey service provider, which generally matches a survey provided by a commissioner with one or more subscribers 1030 who have been targeted for participation in the survey based on, for example, and evaluation by processor 1005 of survey criteria and one or more subscriber profiles.

In one embodiment, subscriber 1030 can register with the survey service provider. This registration may pre-qualify subscribers 1030 as event or survey participants. In various embodiments, subscriber 1030 may include a responder, who generally receives and partakes in a survey, or a survey commissioner, who generally runs or commissions, or requests a survey. When subscribers 1030 register with the survey service provider, they generally supply profile information relating to their personal characteristics, preferences, and membership in various kinds of organizations or groups. The profile information can be used to pre-qualify subscribers 1030 to participate in various surveys in various capacities (e.g., as a responder or as a survey commissioner.)

For example, subscriber 1030 may specify restrictions, if any, on the type of advertisers and advertising subscriber 1030 wishes to be exposed to, so even if the advertiser remains anonymous to them, they know the subscriber commissioner conducting a survey for the advertiser may have been pre-qualified according to, for example, preferences they have given the survey service provider. In one embodiment, a survey commissioner knows that even though a subscriber 1030 who is responding to the survey may remain anonymous, subscriber 1030 nonetheless conforms to any screening criteria (e.g., age, gender, zip code, etc.) they may have specified to the service.

Subscriber 1030 and processor 1005 may communicate via a plurality of communication channels. For example, subscriber 1030 may transmit and receive information related to an identity document via facsimile or mail processing center 1035. Facsimile or mail processing center 1035 is generally configured to transmit and receive facsimile transmissions between subscriber 1030 and processor 1005. In one embodiment facsimile processing center 1035 may include at least one computer adapted to send and receive facsimile transmissions.

Subscriber 1030 and processor 1005 may also communicate via direct electronic processing unit 1040. In one embodiment, direct electronic processing unit 1040 includes at least one network connecting processor 1005 and a computer used by subscriber 1030 such as the Internet, a local or wide area network, telephone network, or cell phone network, for example. Subscriber 1030 and processor 1005 may also communicate via at least one FDC interactive voice response processing center 1045. Voice processing center 1045 generally includes a call center associated with processor 1005. The call center can receive calls from subscriber 1030 and provide information obtained during the calls to processor

1005. Voice processing center 1045 may also access at least one of databases 1010, 1015, 1020, and 1025 via processor 1005 to provide information regarding a survey responder or a survey commissioner subscriber 1030.

Data in a subscriber profile may be supplied from a variety of sources. For example, subscriber profile data may include legally documented or verifiable data provided by trusted third-parties (e.g., car ownership by the Department of Motor Vehicles; property ownership by local municipal offices; etc.). Other information forming a subscriber profile may include personal data or unverifiable opinions, such as subscriber 1030 indicating his or her favorite food, favorite color, or medical condition. A subscriber profile may include information related to subscriber 1030 age, gender, voter registration status, car ownership status, shopping habits, marital status, or number of children for example.

It should be appreciated that in one embodiment the elements of system 1000 are interchangeable with the elements of system 800. For example, and of databases 810, 815, 820, and 825 may be the same database as any of databases 1010, 1015, 1020, and 1025. Similarly, subscriber 830 and subscriber 1030 can be the same subscriber, and processors 805 and 1005 can be the same processor. In one embodiment, system 800 uses the same communications means between processor 805 and subscriber 830 as system 1000 uses for communication between processor 1005 and subscriber 1030.

It can be difficult to conduct large-scale surveys and targeted advertising programs due to the logistics of qualifying and contacting the desired audience and collecting responses. Unsolicited surveys and advertising materials may be perceived as irritating and unwanted by intended recipients and historically have extremely low response rates. Major types of surveys (mail, phone, online) have attendant drawbacks which the present disclosure is designed to address.

For example, mail-in surveys are not anonymous and for this reason may be inaccurate. They can have low response rates and involve slow paper mail delivery services. Telephone surveys, are often random, and if a participant is required to call in, a call center may need to be established, staffed, and coordinated. Survey respondents to telephone surveys are often not anonymous, and do not pre-qualify potential respondents. Existing Internet based online surveys, (which are commonly referred to as open or convenience samples because they allow anyone to self-select into the survey) also cannot identify subscribers tailored to the interest of a survey commissioner, and there may be no way to compare profiles of responders to the survey with the profiles of non-responders. People may also respond more than once to such surveys, thus corrupting the survey results.

Mass advertising (including television, radio, print, and Internet advertisements) also generally is not selective. If it is necessary to target a particular audience who might be more receptive to the mass advertising message, a substantial premium may be paid (e.g., paid television time during the super bowl to reach sports fans) to the advertising distribution channels. Mass advertising events are difficult to monitor from a Customer Relationship Management perspective to determine who was exposed to an advertisement and rejected it, who was exposed to an advertisement and was influenced by it, who was not exposed to an advertisement, and who chose to ignore it, and reasons for each scenario.

The systems and methods as described herein generally enable pre-qualification of subscribers to become event participants. In one embodiment, to use the service, real or corporate persons (including individuals, businesses, government and research organizations, etc.) may register with a service provider to become subscribers. A subscriber may include a person or organization who commissions an advertising or survey event, (i.e., a survey commissioner) and a subscriber who participates in the invited events who may fast register with a service provider as a potential survey responder. During registration, the survey providing service of computer implemented method 900 or system 1000 may collect or receive various profile information which is used to pre-qualify participants for future events. In one embodiment, personal data associated with a subscriber or any subscriber profile information can be independently verified and reported to the service. The survey providing service may assign to each subscriber a numerical, color-coded, or icon rating, or one or more of these ratings, to indicate the level of verification performed on their profile information and its presumed accuracy and reliability. A subscriber's rating may be used as the basis for selecting and inviting them to an event. In one embodiment, ratings assigned to a survey commissioner for an event or survey may be used to decide if a subscriber wants to receive or respond to an invitation by a survey commissioner to participate in a survey. In one embodiment, after registering with a survey service provider, a subscriber may be assigned a log-in ID or a log-in PW to secure access to the system in a manner which, for example, corresponds to system 200.

In one embodiment subscribers may use a user identifier or password to access a web-based interface provided by the survey service provider of system 1000 or computer implemented method 900 to update their profile information. For example, creating a subscriber profile (ACT 930) may include updating the subscriber profile with information such as a subscriber name, location, preferences, profile characteristics, types of service requested, or other personal data received from a subscriber (ACT 910). If data received from a subscriber (ACT 910) matches an existing subscriber profile, the survey service provider may update a database and may, for example, provide confirmation or instructions to a subscriber or to a survey commissioner. If data received from a subscriber does not match an existing subscriber profile, a survey service provider may proceed by creating a new subscriber profile (ACT 920). In one embodiment, subscriber profile information can determine subscriber eligibility to participate in various types of surveys or events. Subscriber profile information may include data as subscriber age, gender, home address, email address, preferences, or membership affiliations.

The survey service provider generally includes computer implemented method 900 or system 1000. In one embodiment, a survey commissioner may contact the survey service provider via an Internet-based interface to commission an advertising or survey event. For example, the interface may allow a survey commissioner to identify a survey or advertising event and to specify: selection criteria for potential program participants; how subscribers will be invited to participate in event (via email, etc.); information to be collected or distributed by service during event; how information will be collected or distributed to program participants (e.g., from the service website or from a website operated by subscriber commissioning the event, or some other means); or special incentives that may be offered to subscribers who participate.

For example, a survey commissioner may contact a survey service provider to commission a survey, The survey commissioner may provide details to the survey service provider regarding the type of survey that is to be conducted. This may, for example, indicate if an event is an advertising or survey event, as well as survey participant criteria, such as characteristics from a subscriber profile that are desirable. The survey service provider may also receive survey parameters such as a number or range of subscribers who may participate, invitation offers, incentives, data collection requirements, or time frames, for example.

In one embodiment, the survey service provider systems and methods disclosed herein include a mechanism to invite subscribers who are qualified participants to events. For example, if a subscriber matches selection criteria provided by a survey commissioner, the subscriber may be invited to participate in an event. In one embodiment, the survey service provider may contact at least one subscriber whose profile matches the criteria of a survey. A subscriber may be contacted by, for example, email, telephone, SMS, text message, or a mailed letter. In one embodiment, the survey service provider of computer implemented method 900 or system 1000 can continue to invite qualified subscribers until, for example, a survey quota is achieved or time limits on the survey expire.

In one embodiment, benefits, prizes, or financial awards may be offered to increase qualified subscriber participation. For example, a subscriber responding to an invitation to participate in a survey or other event based on the subscriber's profile may be offered various forms of incentives to encourage their participation. In one embodiment, the survey service provider can act as an intermediary between the survey commissioner and the subscriber to allow offers to participate in a survey to be made and delivered anonymously, so the identities of all parties may be kept private.

The survey service provider may disseminate event information to subscribers who are included in a survey recipient list responsive to a survey request made by a survey commissioner. The subscribers on the survey recipient list generally include the potential survey participants. The survey service provider, which may include processor 1005, may authenticate and authorize subscribers who respond to invitations to participate in a survey and may perform various accounting functions to record their participation in an event. In one embodiment, after authentication, authorization, and accounting functions are completed, the survey service provider may direct event participants to a URL (Uniform Resource Locator) which, when entered into a participant web browser, can convey the survey or advertising message to a subscriber and receive, in response, data from a subscriber.

In one embodiment, the survey service provider may disseminate survey or other event information to survey commissioners or subscribers. For example, reports created by processor 1005 and stored in database 1025 may be provided to a survey commissioner. These reports may include results of a survey that include subscriber feedback. Reports, updates, or downloadable datasets may be generated and provided to a subscriber or survey commissioner. In a preferred embodiment, the service will direct survey commissioners to a URL (Uniform Resource Locator) on the service website which, when entered into a web browser, can provide a survey commissioner with access to reports or other data.

In one embodiment, subscriber profile information may be validated by third-parties. For example, the extent to which subscriber profile data is validated may determine subscriber 1030 eligibility to receive advertising or survey invitations from a survey commissioner. A validated subscriber profile of at least one subscriber 1030 may enhance their attractiveness and the incentives (e.g., monetary awards, bonus points which can be used in affiliate programs, etc.) they are offered to participate in various advertising or survey programs. Similarly, a survey commissioner's validation score may increase the likelihood that subscriber 1030 accepts an invitation to participate in various advertising or survey events.

A validation score associated with subscriber 1030 may be represented in a number of ways. For example, a validation score may be a numerical rating calculated by the service (for example, from 0-100) using a proprietary formula. A numerical rating may be used to summarize the overall level of validation and specific aspects of the profile information associated with subscriber 1030. In one example of this illustrative embodiment, the overall score for subscriber 1030 might be 80, while their "home zip code" score might be 98, for example.

A numerical rating representing a validation score of one or more subscribers 1030 may be translated into categories represented by pictures or symbols. For example, Subscribers 1030 with scores over 90 may be assigned an icon, for example in the shape of a trophy. These icons may be displayed on a computer associated with a survey service provider network and accessible by subscriber 1030 and at least one survey commissioner. In one embodiment, icons may also be used to pictorially describe the level of verification of a specific aspect of a subscriber profile. For example, different icons such as a trophy (indicating high level of verification and accuracy) or a red flag (indicating low level of verification and accuracy) may be assigned to a subscriber's age or zip code, for example.

In one embodiment, a subscriber 1030 having a validation score greater than, for example, 90 may be assigned an icon in the shape of a blue ribbon. In various embodiments colored icons may be used to describe a level of verification of an aspect of a subscriber profile. For example, blue may indicate a high level of verification and accuracy and red may indicate a low level of verification and accuracy. Colored icons may also be assigned to other subscriber profile information, such as age or zip code, for example.

In one embodiment, a subscriber service provider may verify subscriber profiles. For example, home address information, may be verified by a comparison with a publically available databases. Subscriber profile information may be cross-referenced or verified when subscriber 1030 registers with a survey service provider or at various intervals thereafter.

In one embodiment, validation of a subscriber profile may be enhanced if subscriber 1030 registered with the survey service provider at a designated identification processing center. For example, when school registrars of a school, acting as survey commissioners or as agents of an identification service, enroll subscribers 1030 who are also students of the school subscriber 1030 address information can be verified using third-party sources or the school's own records.

In one embodiment, the survey service provider of system 900 or computer implemented method 1000 may capture and maintain the subscriber 1030 school membership affiliations. The registration process can verify the subscriber 1030 matriculation in a school, and can provide an independent verification of the student's affiliation with the school. In one embodiment, the survey service provider can determine if subscriber 1030 has graduated from a school based at least in part on, for example, the subscriber profile of subscriber 1030. In one embodiment, subscriber database 1010 can maintain verified graduation or alumni membership data. The survey service provider may ask subscriber 1030 to periodically reaffirm subscriber profile information, such as a desire to participate in an organization.

In one embodiment, subscriber 1030 may declare other types of membership affiliations, for example upon registration with a survey service provider. The survey service provider may allow membership organizations to submit membership lists (e.g., with information such as members' name, home address, email, or type of membership data) through various communication channels over a network, (e.g., electronically or via facsimile). Membership fists may be compared to other subscriber profile information provided by subscriber 1030 and stored in a database such as subscriber data database 1010. If there is a match, the survey service provider may send various types of notices (in a preferred embodiment, via a verified email address, for example) to subscriber 1030 asking for confirmation of subscriber 1030 membership in an organization. In one embodiment, where for example both subscriber 1030 and the membership organization confirm membership, subscriber 1030 may be assigned a verified member rating as part of subscriber 1030's subscriber profile information.

In one embodiment, a church may submit a list of, for example parishioner names or email addresses. At various time periods, such as when, for example, subscriber 1030 registers with a survey service provider, the survey service provider may ask subscriber 1030 to confirm or approve on-going membership status with the church. In one embodiment of this example, periodic membership renewals may be required using this process, depending, for example, on the type of organization and how frequently members come and go. This generally allows subscribers 1030, including survey commissioners, to conduct limited scale advertising and survey events targeted to members or a particular church, club, or organization.

In one embodiment subscriber 1030 may use a web-based interface screen provided by survey service provider to opt-in to various types of survey and advertising programs. For example, subscriber 1030 may opt-into survey and advertising programs at the time of their registration with the survey service provider, or they may decide to opt-in at any other time during their service subscription. This information can be updated as desired by the subscriber 1030 to reflect changing needs and preferences.

For example, subscriber 1030 may opt in to various categories of advertising programs (electronics, food program, clothing, etc.) offered by a survey commissioner because, for example, subscriber 1030 may be looking for information on products and services they wish to acquire. For example, subscriber 1030 might indicate in a subscriber profile that subscriber 1030 wants information from advertisers on fine chocolates. The survey service provider may then provide a survey commissioner associated with candy surveys a lead as to the existence of subscriber 1030 without revealing the identity of subscriber 1030.

Subscriber 1030 may agree to participate in any kind of survey; however in one embodiment, subscriber 1030 may only consent to participate in, for example automobile-related advertising programs. Subscriber 1030 may subsequently change positions, and allow survey commissioners associated with, for example, digital cameras or electronic equipment to contact them. In one embodiment, subscriber 1030 may be prompted for additional data to determine if subscriber 1030 fits within the criteria of a survey provided by a survey commissioner.

In one embodiment, subscribers 1030 may use assigned user identifiers or passwords to access a web-based interface provided by a survey service provider to periodically update a subscriber profile, including any account preferences or service selections. The survey service provider may also gather information from a variety of independent third-party sources to update subscriber profile information, with or without the knowledge of subscriber 1030.

In one embodiment, the survey service provider systems and methods disclosed herein can provide a web-based graphical user interface to allow survey commissioners to request a survey or advertising event. In one embodiment, an interface for a survey commissioner to enter data received by a survey service provider may appear as indicated in Table 3 below.

TABLE 3

Sample Data Elements to Commission Survey Event

COMMISSIONER
Identification: Subscriber
MarketPulseSurveys.com  Identifier  Password
Type of Event:  Survey
RESPONDER SELECTION CRITERIA
Desired Sample Size: 1000
Minimum Sample Size: 500

| Category Label | % Total Subscribers | Selection Criterion: Min Age | Selection Criterion: Max Age | Selection Criterion: Gender |
|---|---|---|---|---|
| <21 Males | 20% | 18 | 20 | Male |
| >21, Males | 30% | 21 | 30 | Male |
| <21 Females | 30% | 18 | 20 | Female |
| >21 Females | 20% | 21 | 30 | Female |
|  | Total: 100% |  |  |  |

As shown in Table 3, an exemplary survey commissioner—MarketPulseSurveys.com—has requested a survey with a minimum of 500 people and a desired sample size of 1000. In this illustrative embodiment, the survey commissioner has also requested that the sample be comprised of: 20% 18-20 year-old males, 20% 18-22 year-old females, 30% 21-30 year-old males, and 30% 21-30 year-old females. Thus, age and gender are the selection criteria for the survey event of this example. For example, a survey commissioner may want to survey young car buyers about their reactions to a new electronic device for their car, and the survey may be directed toward specified the ratios of the sample populations, based on, for example an advertising budget or marketing campaign plans of a survey commissioner or of a company associated with the survey commissioner. In the embodiment of Table 3 above, group categories may be based on subscriber 1030 age. In various embodiments, however, group categories by be based on various data included in subscriber profiles, survey commissioner supplied designations, or subscriber 1030 categories generated by the survey service provider.

In one embodiment, information regarding potential survey participants can be stored in a database maintained by the service, and various selection techniques may identify suitable subscribers 1030 from this database who may then receive an event invitation. In one embodiment, random selection may be used to pick subscribers 1030. In another embodiment, anonymous nonrandom selection mechanisms may be used. For example, students at a school may be issued a survey invitation. In this illustrative embodiment, the survey selection need not be random, and the survey responses can be anonymous. In one embodiment, a non-random sample of potential survey participants from a plurality of subscribers 1030 may be desired, such as known purchasers of a product, for a survey being conducted by the product manufacturer.

For example, subscriber 1030 may be a male aged 25 years. This subscriber 1030 can be selected by the survey service provider and issued an invitation to participate in a survey commissioned by a survey commissioner. In one embodiment, this subscriber 1030 may receive an email invitation to a verified email address. If subscriber 1030 decides to accept the invitation, instructions on how to complete the survey can be provided. In one embodiment of this example, the email invitation may include a link so that subscriber 1030 can access a website with the survey. The survey may include, for example, a questionnaire form. In one embodiment, subscriber 1030 may not know the reason for his or her selection in an event. This reduces the incentive for subscribers 1030 to misrepresent their preferences and other profile information in order to participate in a survey, possibly to receive an incentive, for which they are not eligible.

Continuing with the example, if subscriber 1030 does not reply within a given time period, the service might send another email to him repeating the invitation. If subscriber 1030 fails to respond, the service might also select a different subscriber 1030 from the pre-qualified pool of survey candidates. In one embodiment, the survey service provider can send sufficient invitations to qualified subscribers 1030 to gather the required number of responses to satisfy survey commissioner demands.

In one embodiment, the survey service provider may monitor previous response rates to similar solicitations and to thereby compute the probability of response of subscribers 1030. For example, subscribers 1030 with higher response rates may be selectively or preferentially issued invitations in exchange for, for example, higher service processing fees collected from survey commissioners by the survey service provider. In another embodiment higher incentive awards (e.g., cash payments) may be provided to subscribers 1030 who respond to a survey. It should be appreciated that the survey service provider of the systems and methods described herein, such as computer implemented method 900 and system 1000 may capture historical data and the associated response rates of subscribers 1030. This data may be used to update subscriber profiles of subscribers 1030 and may refine the generation of survey recipient lists identifying subscribers 1030 as potential survey recipients. In one embodiment subscribers 1030 may offer incentives such as monetary payments or awards of points that may be used to acquire goods or services to survey commissioners so that subscribers 1030 may be included in survey recipient lists.

In one embodiment, logic such as processor 1005 associated with the survey service provider may authenticate or authorize subscribers 1030 who respond to invitations. This logic may also perform various accounting functions to record subscriber 1030 participation in an event. In one embodiment, after the authentication, authorization, and accounting (AAA) functions are completed, the survey service provider may direct event participants to a URL (Uniform Resource Locator) which, when entered into a web browser, conveys the survey or advertising message to subscriber 1030 and receives required data from subscriber 1030.

In one embodiment, an advertiser associated with the survey commissioner may wish to remain anonymous. For example only pre-qualified and interested subscribers 1030 may be aware of the advertiser's identity. This is a discreet way to advertise to interested, pre-qualified subscribers 1030, and to disseminate information without revealing the identity of an advertiser associated with a survey commissioner.

In one embodiment, the survey service provider may provide reports regarding surveys or associated information, (e.g., how many subscribers 1030 viewed an advertising message, responded to an advertising message, etc.) Other data may be collected to document the particulars of a survey or event, and may be made available to survey commissioners as they are received through various communication channels. In one embodiment, these reports may be stored in or accessed from reports database 1025.

Survey reports may also include data related to the number of subscribers 1030 that participated in the survey, for example. Table 4 below demonstrates and exemplary summary report that may be generated by processor 205, stored in database 1025, and provided to subscriber 1030 or a survey commissioner.

Question 1: How often do you talk on a cell phone while driving?

TABLE 4

Sample Survey Summary Report

| | Always | Often | Sometimes | Rarely | Never |
|---|---|---|---|---|---|
| Group 1 | 1 | 8 | 8 | 2 | 6 |
| Group 2 | 2 | 9 | 8 | 3 | 3 |
| Group 3 | 0 | 2 | 3 | 5 | 3 |
| Group 4 | 1 | 4 | 3 | 3 | 2 |

In one embodiment, a more detailed reports and dataset associated with detailed subscriber 1030 responses may be used for data mining and other statistical and analytical studies, as shown in sample Table 5.

TABLE 5

Sample Survey-Detailed Report

| Question | Group | Response | Date | Time |
|---|---|---|---|---|
| 1 | 2 | 2 | 0000-00-00 | 00:00:00 |
| 1 | 3 | 4 | Dec. 04, 2006 | 00:00:00 |
| 1 | 4 | 1 | Dec. 04, 2006 | 12:21:20 |
| 1 | 1 | 3 | Dec. 04, 2006 | 13:48:02 |
| 1 | 1 | 3 | Dec. 04, 2006 | 15:07:57 |
| 1 | 2 | 3 | Dec. 04, 2006 | 15:11:23 |
| 1 | 3 | 5 | Dec. 04, 2006 | 16:03:45 |

In one embodiment, a number of subscribers 1030 who, for example, responded to a survey within a given time period such as within one day of receipt of an invitation to participate in a survey are reported, as shown in Table 6.

TABLE 6

Sample Advertising Campaign-Responses After First Day

| Group | Desired Sample | Replies Received |
|---|---|---|
| 1 | 100 | 104 |
| 2 | 100 | 96 |
| 3 | 50 | 51 |
| 4 | 50 | 49 |

In the embodiment illustrated in Table 6, Group 2 has the smallest ratio of replies to the desired sample size. In this example, the survey service provider may report all Table 6 results as received to-date to a survey commissioner; or it may report a normalized selection from the replies received, for example by selecting only the first 96 replies in Group 1 and the first 48 replies for Groups 3 and 4; or it may hold the records and may not release them to the requesting survey commissioner until sufficient responses have been collected.

In one embodiment, the survey service provider receives subscriber profiles of subscribers and maintains confidentiality and anonymity of all associated parties. For example, it may be known that male subscribers 1030 and female subscribers 1030 who responded to the survey were members of a credit union, while subscribers 1030 who did not respond were not members of a credit union. In one embodiment, the survey service provider can track characteristics of subscribers 1030 who are eligible voters relative to subscribers 1030 who did and did not vote.

The systems and methods of computer implemented method 900 and system 1000 include a survey service provider that allows surveys and advertising events to be commissioned using a web-based interface. Subscribers 1030 are selected from a pool of potential subscribers who provide various types of information to the survey service provider. This information may be used to pre-qualify subscribers 1030 for invitations to partake in a survey. If subscriber 1030 is identified as a willing survey participant, they may be invited to participate in surveys or other marketing events.

In one embodiment, the survey service provider may anonymously authenticate and authorize subscriber 1030 and perform various accounting functions to record subscriber 1030 participation in the survey. Associated logic may also record incentives due to subscriber 1030, such as award points in an award program. When the "AAA" (authenticate, authorize, and accounting) functions have been completed, subscriber 1030 may be directed to a survey commissioner's website to receive delivery of the survey or advertising materials. Real-time updates may be provided to survey commissioners.

In various embodiments, subscriber 1030 can include any person or entity. Thus, the survey service provider enables access to a large pool of potential survey participants who have agreed to participate in various anonymous survey and/or advertising programs, possibly in exchange for receiving various kinds of benefits or rewards. Subscribers 1030 are generally pre-qualified in terms of identity verification, profile information, interest, or willingness to participate in various types surveys or events. Subscribers 1030, including survey commissioners, can register to establish the subscriber 1030 identity.

In various embodiments, validation levels, membership affiliations, or other subscriber profile data can be used to pre-screen subscribers 1030 for survey participation to ensure that survey criteria is met. Subscribers 1030 may remain anonymous and unknown to each other.

In one embodiment, survey results can be reported to a survey commissioner or associated advertiser or agent while maintaining confidentiality and anonymity of subscribers 1030. Characteristics of subscribers 1030 may be tracked and participating subscribers 1030 can be compared against non-participating subscribers 1030 for statistical or other purposes.

In one embodiment, processor 1005 can evaluate subscriber profiles to create a list of potential survey participants where each potential survey participant is a subscriber 1030. These subscribers 1030 may partake in various types marketing, research, or scientific surveys requested by survey commissioners. For example, subscriber profiles of one group of subscribers 1030 may indicate that subscribers 1030 have asthma, but do not take any regular treatment (and thus these subscribers 1030 could be included in a survey recipient list assigned to a control group of a survey that is part of a scientific study. In one embodiment, subscriber profiles of a group of subscribers 1030 may indicate that subscribers 1030 take a particular medicine for asthma, and these subscribers 1030 may form part of another recipient list assigned to a corresponding treatment group for purposes of the same scientific study.

In one embodiment, after assigning designations to subscribers 1030 for a particular survey, the survey service provider may generate a survey recipient list of subscribers 1030 according to, for example, research requirements, and invite subscribers 1030 on the survey recipient list to participate in a variety of surveys including scientific and statistical analyses.

In one embodiment, subscriber 1030 category designations may be assigned based on subscriber 1030's membership affiliations, by self-selection, or by assignment by the survey service provider according to, for example, rules defined by the survey commissioner. In one embodiment, survey service provider may distribute health messages or other alerts to subscribers 1030 whose subscriber profile indicates a health or safety risk. Once subscribers 1030 in categories of interest to a survey commissioner are selected, the survey service provider may send follow-up surveys (for a variety of purposes, such as testing of comprehension of the health message, changes to behavior, or reactions to message tone.

In one embodiment, a group of subscribers 1030 may be invited to receive an advertising message (e.g., a television advertisement) prior to it being shown on national television. In this illustrative embodiment, the survey service provider may follow-up with subscribers 1030 who viewed the test advertisement to administer surveys that record subscriber 1030 comments and reactions. This provides a way to give survey commissioners real time feedback on an advertisement's impact and effectiveness. In one embodiment, the survey service provider may provide tracking reports for subscribers 1030 to generate data indicating how the presentation of a series of advertising messages impact subscriber 1030 answers to questions presented in follow-up surveys. In one embodiment this may be done anonymously so that subscribers 1030 including survey commissioners do not know the identity of any other parties.

In one embodiment, the survey service provider captures data on past events and the associated response rates of invited subscribers 1030. This may be used to update subscriber profiles or to refine subscriber 1030 pre-qualification in future surveys. The survey service provider may also assist in the selection of high-response subscribers 1030 to ensure that responses are generated quickly and in sufficient numbers to meet a survey commissioner's objectives. The survey service provider can adapt the invitation process based on the responses collected from subscribers 1030, and may increase or decrease the number of issued invitations, shorten the invitation period, or adjust other types of event or survey parameters.

Note that in FIGS. 1 through 10, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a, computer disk (magnetic, or optical (e.g., CD or DVD, or both), non-volatile memory, tape, a system memory, and a computer hard drive.

Any references to front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features mentioned in any claim are followed by reference signs, the reference signs have been included for the sole purpose of increasing the intelligibility of the claims and accordingly, neither the reference signs nor their absence have any limiting effect on the scope of any claim elements.

One skilled in the art will realize the systems and methods described herein may be embodied in other specific forms without departing from the spirit or essential characteristics thereof. The foregoing embodiments are therefore to be considered in all respects illustrative rather than limiting of the described systems and methods. For example, the systems 200, 600, and 800, methods 100, 600, and 700, and screenshots 400 and 500 can be part of the Identity Theft Prevention Service. Further, functionality described with respect to log-in server 205 and processor 805 is interchangeable, and each of these components can be part of one or more server (e.g., in a data center) configured to implement the ITPS services discussed herein. The log-in server 205 is not restricted to log-in operations and can perform the operations discussed herein with regard to both log-in server 205 and processor 805. Further discussions as to subscriber activity can be imparted to their corresponding subscriber servers. Additionally, subscriber servers are not restricted to narrowly defined servers, but rather can more generally describe computing devices, from servers in data centers, to desktop, laptop or tablet computers. The ITPS can be a stand alone service, or can operate together with the EUAS or FDC services discussed herein. Scope of the systems and methods described herein is thus indicated by the appended claims, rather than the foregoing description, and all changes that come within the meaning and range of equivalency of the claims are therefore intended to be embraced therein.

What is claimed is:

1. A computer implemented method for identifying potentially improper use of identity documents as part of an identity theft prevention service, comprising:
receiving, at a server of a fraud data collection platform via a computer network, from a first subscriber server of a first subscriber, information related to an identity document and authorization data indicating registration of the first subscriber with an identity theft prevention service;
storing the information related to the identity document in a database;
performing a comparison of the information related to the identity document with prior activity data related to use of the identity document and received from a second subscriber registered with the identify theft prevention service, the prior activity data stored in the database;
identifying, based on the comparison, at least one instance of potential identity document misuse; and
informing, based at least in part on the authorization data, at least one of the first subscriber, the second subscriber and a third subscriber registered with the identify theft prevention service of data identifying the at least one instance of potential identity document misuse via a communication session established between the fraud data collection platform and at least one of the first subscriber server associated with the first subscriber, a second subscriber server of the second subscriber, and a third subscriber server of the third subscriber.

2. The computer implemented method of claim 1, wherein the prior activity data includes information related to a presentation of the identity document.

3. The computer implemented method of claim 1, comprising:
receiving the authorization data from the first subscriber, wherein the authorization data identifies at least one of the second subscriber and the third subscriber.

4. The computer implemented method of claim 1, comprising:
receiving, at the server and from a subscriber server associated with the first subscriber via the computer network, registrant identification data of the first subscriber;
generating an account for the first subscriber based at least in part on the registrant identification data; and
updating the account for the first subscriber with a result of the comparison identifying the at least one instance of potential identity document misuse.

5. The computer implemented method of claim 1, comprising:
denying, responsive to a result of the comparison identifying the at least one instance of potential identity document misuse, by the server of the fraud data collection platform, a request to establish a session via the computer network between a computer and at least one of a first subscriber server of the first subscriber, a second subscriber server of the second subscriber, and a third subscriber server of the third subscriber.

6. The computer implemented method of claim 1, comprising:
receiving registrant identification data that identifies categories of content that a computer is authorized to access via the computer network;
receiving, from a subscriber server of one of a plurality of subscriber servers associated with the identity theft prevention service, subscriber server identification data that identifies categories of content that the subscriber server is configured to make available via the computer network; and
authorizing establishment of a first communication session between the computer and at least one of the server of the fraud data collection platform and the subscriber server to provide, based in part on the registrant identification data and the subscriber identification data, access from the computer to content associated with the subscriber server via the computer network.

7. The computer implemented method of claim 1, comprising:
receiving registrant identification data that identifies categories of content that a computer is authorized to access via the computer network;
receiving, from a subscriber server of one of a plurality of subscriber servers associated with the identity theft prevention service, subscriber server identification data that identifies categories of content that the subscriber server is configured to make available via the computer network; and
blocking establishment of a first session between the computer and at least one of the server of a fraud data collection platform and the subscriber server to provide, based in part on the registrant identification data and the subscriber identification data, access from the computer to content associated with the subscriber server.

8. The computer implemented method of claim 1, comprising:
blocking establishment of the first session based at least in part on the at least one instance of potential identity document misuse.

9. The computer implemented method of claim 1, the identity theft prevention service having a plurality of subscribers including the first subscriber, the second subscriber, and the third subscriber, further comprising:
receiving, by a computing device of the fraud data collection platform, a request for a research study;
generating first data indicating at least one of a frequency, a type, a geographic location, and a nature of the identity document;
generating second data indicating a misuse of at least one of the identity document and a class of identity documents; and
providing the research study to one of the plurality of subscribers, the research study including at least one of the first data and the second data.

10. The computer implemented method of claim 1, the identity theft prevention service having a plurality of subscribers including the first subscriber, the second subscriber, and the third subscriber, further comprising:
informing at least one of the plurality of subscribers of the at least one instance of potential identity document misuse indicating past improper use of the identity document.

11. The computer implemented method of claim 1, wherein at least one of the first subscriber, the second subscriber, and the third subscriber includes at least one of a merchant, a government agent, a registrar, a parent, a health care provider, an educational institution, a registered organizational entity, a governmental organization, and a financial institution.

12. The computer implemented method of claim 1, further comprising:
determining a risk level associated with the identity document; and
providing an indicator of the risk level to at least one of the first subscriber, the second subscriber, and the third subscriber.

13. A system for identifying potentially improper use of an identity document via a computer network as part of an identity theft prevention service, comprising:
a fraud data collection platform having at least one server and at least one database, the fraud data collection platform configured to:
receive, from a first subscriber of a first subscriber, during at least one communication session via the computer network between the fraud data collection platform and a subscriber server of the first subscriber, information related to the identity document and authorization data indicating registration of the first subscriber with an identity theft prevention service;
store at least one of the information related to the identity document and the authorization data in the database;
perform a comparison of the information related to the identity document with prior activity data related to use of the identity document and received from a second subscriber registered with the identity theft protection service;
identify, based on the comparison, at least one instance of potential identity document misuse; and
inform, based at least in part on the authorization data, at least one of the first subscriber, the second subscriber, and a third subscriber of the identity theft prevention service, of data identifying the at least one instance of potential identity document misuse.

14. The system of claim 13, wherein the prior activity data includes information related to a presentation of the identity document.

15. The system of claim 13, comprising the fraud data collection platform configured to:
receive the authorization data from the first subscriber, wherein the authorization data identifies at least one of the second subscriber and the third subscriber.

16. The system of claim 13, comprising the fraud data collection platform configured to:
receive registrant identification data of the first subscriber;
generate an account for the first subscriber based at least in part on the registrant identification data; and
update the account for the first subscriber with a result of the comparison identifying the at least one instance of potential identity document misuse.

17. The system of claim 13, comprising the fraud data collection platform configured to:
deny, responsive to a result of the comparison identifying the at least one instance of potential identity document misuse, by the server of the fraud data collection platform, a request to establish a session via the computer network between a computer and at least one of a first subscriber server of the first subscriber, a second subscriber server of the second subscriber, and a third subscriber server of the third subscriber.

18. The system of claim 13, comprising the fraud data collection platform configured to:
receive registrant identification data that identifies categories of content that a computer is authorized to access via the computer network;
receiving, from a subscriber server of one of a plurality of subscriber servers associated with the identity theft prevention service, subscriber server identification data that identifies categories of content that the subscriber server is configured to make available via the computer network; and
authorizing establishment of a first session between the computer and at least one of the server of a fraud data collection platform and the subscriber server to provide, based in part on the registrant identification data and the subscriber identification data, access from the computer to content associated with the subscriber server.

19. The system of claim 13, comprising the fraud data collection platform configured to:
obtain registrant identification data that identifies categories of content that a computer is authorized to access via the computer network;
obtain, from a subscriber server of one of a plurality of subscriber servers associated with the identity theft prevention service, subscriber server identification data that identifies categories of content that the subscriber server is configured to make available via the computer network; and
block establishment of a first session between the computer and at least one of the server of a fraud data collection platform and the subscriber server to provide, based in part on the registrant identification data and the subscriber identification data, access from the computer to content associated with the subscriber server.

20. A non-transitory computer readable storage medium having instructions to provide information via a computer network, the instructions comprising instructions to:
- receive, from a first subscriber via the computer network, information related to the identity document and authorization data indicating registration of the first subscriber with an identity theft prevention service;
- store at least one of the information related to the identity document and the authorization data in the database;
- perform a comparison of the information related to the identity document with prior activity data related to use of the identity document and received from a second subscriber registered with the identity theft protection service;
- identify, based on the comparison, at least one instance of potential identity document misuse; and
- inform, based at least in part on the authorization data, at least one of the first subscriber, the second subscriber, and a third subscriber of the identity theft prevention service, of data identifying the at least one instance of potential identity document misuse.

* * * * *